United States Patent
Kubota et al.

(10) Patent No.: US 10,553,343 B2
(45) Date of Patent: *Feb. 4, 2020

(54) ELECTRONIC COMPONENT AND METHOD FOR MANUFACTURING THE SAME

(71) Applicant: MURATA MANUFACTURING CO., LTD., Kyoto-fu (JP)

(72) Inventors: Hironobu Kubota, Nagaokakyo (JP); Mitsunori Inoue, Nagaokakyo (JP); Tomohiko Mori, Nagaokakyo (JP); Gota Shinohara, Nagaokakyo (JP); Kenji Nishiyama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 184 days.

This patent is subject to a terminal disclaimer.

(21) Appl. No.: 15/366,816

(22) Filed: Dec. 1, 2016

(65) Prior Publication Data

US 2017/0084376 A1 Mar. 23, 2017

Related U.S. Application Data

(63) Continuation of application No. PCT/JP2015/071057, filed on Jul. 24, 2015.

(30) Foreign Application Priority Data

Jul. 25, 2014 (JP) .................................. 2014-151348
Feb. 6, 2015 (JP) .................................. 2015-021907

(51) Int. Cl.
*H01F 27/255* (2006.01)
*H01F 17/00* (2006.01)
(Continued)

(52) U.S. Cl.
CPC .......... *H01F 27/255* (2013.01); *C09K 13/00* (2013.01); *C09K 13/06* (2013.01); *C09K 13/08* (2013.01);
(Continued)

(58) Field of Classification Search
CPC .. H01F 27/255; H01F 27/2823; H01F 27/292; H01F 27/23; H01F 27/02;
(Continued)

(56) References Cited

U.S. PATENT DOCUMENTS 5,863,407 A    1/1999  Kiyokawa
6,373,368 B1 *  4/2002  Shikama ................. H01F 41/04
                                                 29/605
(Continued)

FOREIGN PATENT DOCUMENTS

JP    H09-148105 A    6/1997
JP    H10-223407 A    8/1998
(Continued)

OTHER PUBLICATIONS

An Office Action; "Notification of Reasons for Revocation," Mailed by the Japanese Patent Office dated May 15, 2018, which corresponds to Japanese Patent Application No. 2018-700103 and is related to U.S. Appl. No. 15/366,816; with English language translation.

(Continued)

*Primary Examiner* — Mang Tin Bik Lian
(74) *Attorney, Agent, or Firm* — Studebaker & Brackett PC

(57) ABSTRACT

An electronic component includes a main body composed of an insulator, a coating film covering the main body, a circuit element located inside the main body, and outer electrodes.

(Continued)

The insulator contains a metal magnetic powder. The coating film is composed of a resin and a cationic element contained in the insulator.

2 Claims, 12 Drawing Sheets

(51) Int. Cl.

| | | |
|---|---|---|
| H01F 27/02 | (2006.01) | |
| H01F 27/23 | (2006.01) | |
| H01F 41/04 | (2006.01) | |
| H01G 4/12 | (2006.01) | |
| C09K 13/00 | (2006.01) | |
| C09K 13/06 | (2006.01) | |
| C09K 13/08 | (2006.01) | |
| H01F 1/03 | (2006.01) | |
| H01F 27/28 | (2006.01) | |
| H01F 27/29 | (2006.01) | |
| H01F 41/02 | (2006.01) | |

(52) U.S. Cl.
CPC ........... *H01F 1/0306* (2013.01); *H01F 17/00* (2013.01); *H01F 27/02* (2013.01); *H01F 27/23* (2013.01); *H01F 27/2823* (2013.01); *H01F 27/292* (2013.01); *H01F 41/0206* (2013.01); *H01F 41/04* (2013.01); *H01G 4/12* (2013.01)

(58) Field of Classification Search
CPC .... H01F 27/2804; H01F 1/0306; H01F 17/00; H01F 17/0006; H01F 17/0013; H04F 41/0206; C09K 13/00; C09K 13/06; C09K 13/08; H01G 4/12
USPC ......................................... 336/200, 223, 233
See application file for complete search history.

(56) References Cited

U.S. PATENT DOCUMENTS

| | | | | |
|---|---|---|---|---|
| 2002/0050909 | A1* | 5/2002 | Jinno | ................... H01C 1/034 338/21 |
| 2013/0222101 | A1* | 8/2013 | Ito | ......................... H01F 17/04 336/83 |
| 2013/0293334 | A1* | 11/2013 | Shin | ......................... H01F 1/26 336/192 |
| 2014/0184374 | A1 | 7/2014 | Park et al. | |

FOREIGN PATENT DOCUMENTS

| | | |
|---|---|---|
| JP | 2002-033237 A | 1/2002 |
| JP | 2003-145034 A | 5/2003 |
| JP | 3498919 B2 | 2/2004 |
| JP | 3648320 B2 | 5/2005 |
| JP | 2009-055412 A | 3/2009 |
| JP | 2011-249615 A | 12/2011 |
| JP | 2012-015395 A | 1/2012 |
| JP | 2012-238736 A | 12/2012 |
| JP | 2013-225718 A | 10/2013 |
| JP | 2013-245395 A | 12/2013 |
| KR | 10-1998-0703131 A | 10/1998 |
| KR | 10-2014-0085997 A | 7/2014 |
| WO | 2014/119564 A1 | 8/2014 |

OTHER PUBLICATIONS

International Search Report issued in PCT/JP2015/071057; dated Sep. 29, 2015.
Written Opinion issued in PCT/JP2015/071057; dated Sep. 29, 2015.
International Preliminary Report on Patentability issued in PCT/JP2015/071057; dated Jan. 31, 2017.
An Office Action; "Notification of Preliminary Rejection," issued by the Korean Intellectual Property Office dated Mar. 30, 2018, which corresponds to Korean Patent Application No. 10-2017-7001002 and is related to U.S. Patent Application.
Notification of the First Office Action issued by the State Intellectual Property Office of the People's Republic of China dated Nov. 1, 2017, which corresponds to Chinese Patent Application No. 201580023485.9 and is related to U.S. Appl. No. 15/366,816.

* cited by examiner

ELECTRONIC COMPONENT AND METHOD FOR MANUFACTURING THE SAME

CROSS REFERENCE TO RELATED APPLICATION

This application claims benefit of priority to Japanese Patent Application 2014-151348 filed Jul. 25, 2014, and to Japanese Patent Application 2015-021907 filed Feb. 6, 2015, and to International Patent Application No. PCT/JP2015/071057 filed Jul. 24, 2015, the entire content of which is incorporated herein by reference.

TECHNICAL FIELD

The present disclosure relates to an electronic component and a method for manufacturing the same. In particular, the present disclosure relates to an electronic component including an insulator containing a metal magnetic powder and a method for manufacturing the same.

BACKGROUND

A coil component described in Japanese Unexamined Patent Application Publication No. 2013-225718 is known as an electronic component including an insulator containing a metal magnetic powder. In this type of electronic component (hereafter referred to as an electronic component in the related art), an inner circuit element is covered with an insulator containing a metal magnetic powder. In addition, in the electronic component in the related art, a chemical conversion treatment with a phosphate is performed for the purpose of rust prevention and the like of the metal magnetic powder contained in the insulator. However, in general, coating films formed by employing the chemical conversion treatment with a phosphate are thin, and the moisture resistance, the chemical resistance, and the like are insufficient for the quality of the coating film required for the electronic component.

SUMMARY

Technical Problem

It is an object of the present disclosure to provide an electronic component including an insulator containing a metal magnetic powder, where the electronic component has a resin coating film on the insulator, and a method for manufacturing the same.

Solution to Problem

An electronic component according to the present disclosure includes a main body including an element assembly composed of a metal magnetic powder and an insulating resin and an inner conductor located inside the element assembly, a coating film covering the main body, and outer electrodes connected to the inner conductor, wherein the coating film contains a cation of an element constituting the metal magnetic powder and a resin.

In the electronic component according to the present disclosure, preferably, the metal magnetic powder is a powder of Fe or an Fe alloy, and the inner conductor is Cu or Ag.

Meanwhile, a method for manufacturing an electronic component, according to the present disclosure, includes the steps of preparing a main body including an element assembly composed of a metal magnetic powder and an insulating resin and an inner conductor located inside the element assembly, preparing a resin emulsion containing an etching component for ionizing a metal constituting the metal magnetic powder, an anionic surfactant, and a resin component, coating the main body with the resin emulsion and performing drying, and forming outer electrodes connected to the inner conductor.

Also, in the method for manufacturing an electronic component according to the present disclosure, preferably, the metal magnetic powder is a powder of Fe or an Fe alloy, and the inner conductor is Cu or Ag.

In addition, in the method for manufacturing an electronic component according to the present disclosure, preferably, the etching component is hydrofluoric acid, sulfuric acid, acetic acid, nitric acid, or hydrochloric acid.

Also, in the method for manufacturing an electronic component according to the present disclosure, preferably, the anionic surfactant has a sulfonic acid group.

Also, in the method for manufacturing an electronic component according to the present disclosure, preferably, the resin emulsion further contains an oxidizing agent serving as an etching-facilitation component.

Also, in the method for manufacturing an electronic component according to the present disclosure, preferably, the resin emulsion further contains iron fluoride serving as an additive.

According to the electronic component of the present disclosure, the coating film covering the main body is composed of the resin and the cationic element contained in the insulator. The coating film having such a configuration has excellent moisture resistance, chemical resistance, and the like compared with the coating film formed by employing a common phosphate chemical conversion treatment.

Also, in the electronic component according to the present disclosure, in the case where the metal magnetic powder is a powder of Fe or an Fe alloy and the inner conductor is Cu or Ag, it is possible to make the coating film easily selectively attach to the metal magnetic powder contained in the element assembly rather than the inner conductor because Fe has an ionization tendency larger than that of Cu or Ag. On the other hand, if the coating film is formed on the inner conductor, the continuity between the inner conductor and the outer electrode is degraded. However, employment of the above-described configuration can avoid degradation of the continuity.

According to the method for manufacturing an electronic component of the present disclosure, the steps of preparing a main body including an element assembly composed of a metal magnetic powder and an insulating resin and an inner conductor located inside the element assembly, preparing a resin emulsion containing an etching component for ionizing a metal constituting the metal magnetic powder, an anionic surfactant, and a resin component, coating the main body with the resin emulsion and performing drying, and forming outer electrodes connected to the inner conductor are included and, thereby, an electronic component exhibiting excellent moisture resistance and chemical resistance can be obtained.

Also, in the method for manufacturing an electronic component according to the present disclosure, in the case where the metal magnetic powder is a powder of Fe or an Fe alloy and the inner conductor is Cu or Ag, it is possible to make the coating film easily selectively attach to the metal magnetic powder contained in the element assembly rather than the inner conductor because Fe has an ionization tendency larger than that of Cu or Ag.

Further, in the method for manufacturing an electronic component according to the present disclosure, in the case where the etching component is hydrofluoric acid, sulfuric acid, acetic acid, nitric acid, or hydrochloric acid, the film formation property of the coating film is improved.

Meanwhile, if the surfactant is not easily deactivated, the coating film is not formed, and if the surfactant is too easily deactivated, the resin emulsion becomes too unstable and is not easily handled. However, in the method for manufacturing an electronic component according to the present disclosure, in the case where the anionic surfactant has a sulfonic acid group, the degree of deactivation of the surfactant is appropriate.

Further, in the method for manufacturing an electronic component according to the present disclosure, in the case where the resin emulsion further contains an oxidizing agent serving as an etching-facilitation component, ionization of the metal easily proceeds, and formation of the coating film is facilitated.

Also, in the method for manufacturing an electronic component according to the present disclosure, in the case where the resin emulsion further contains iron fluoride serving as an additive, there is a good balance between cations generated by etching with the resin emulsion and deactivation of the surfactant, and a uniform coating film can be formed.

Advantageous Effects of Disclosure

According to the present disclosure, in an electronic component including an insulator containing a metal magnetic powder, a resin coating film can be obtained on the insulator, and the electronic component exhibiting excellent moisture resistance and chemical resistance can be obtained.

DETAILED DESCRIPTION (First Embodiment)
(Configuration of Electronic Component, Refer to FIG. 1 to FIG. 4)

An electronic component 1 according to a first embodiment will be described with reference to the drawings. Hereafter the direction orthogonal to the bottom surface of the electronic component 1 is defined as the z-axis direction. Also, in plan view when viewed in the z-axis direction, the direction of the long side of the electronic component 1 is defined as the x-axis direction, and the direction of the short side of the electronic component 1 is defined as the y-axis direction. In this regard, the x-axis, the y-axis, and the z-axis are orthogonal to each other.

Figure 1:
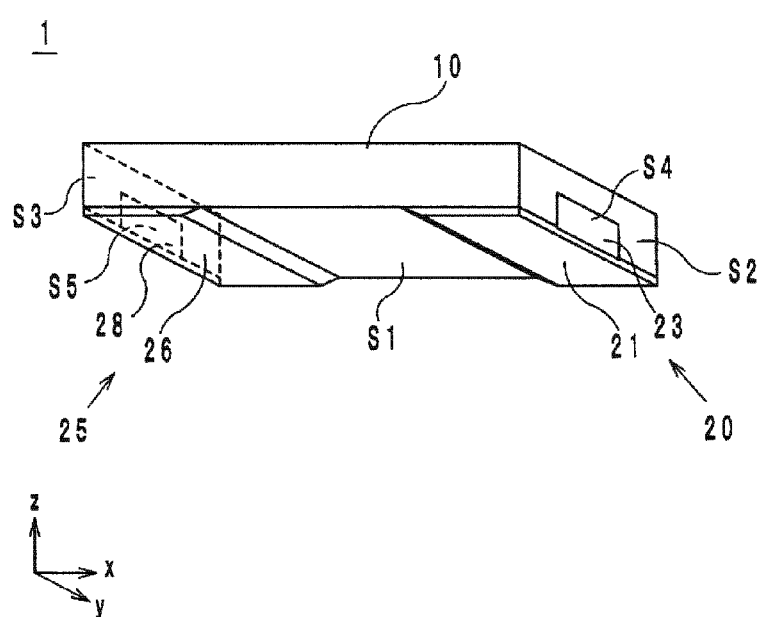
FIG. 1 is a perspective view of an electronic component according to a first embodiment.

As shown in FIG. 1, the electronic component 1 includes a main body 10 and outer electrodes 20 and 25. In addition, the electronic component 1 includes a coating film 9 covering the main body 10 and a circuit element 30. Also, the electronic component 1 has a substantially rectangular parallelepiped shape.

Figure 2:
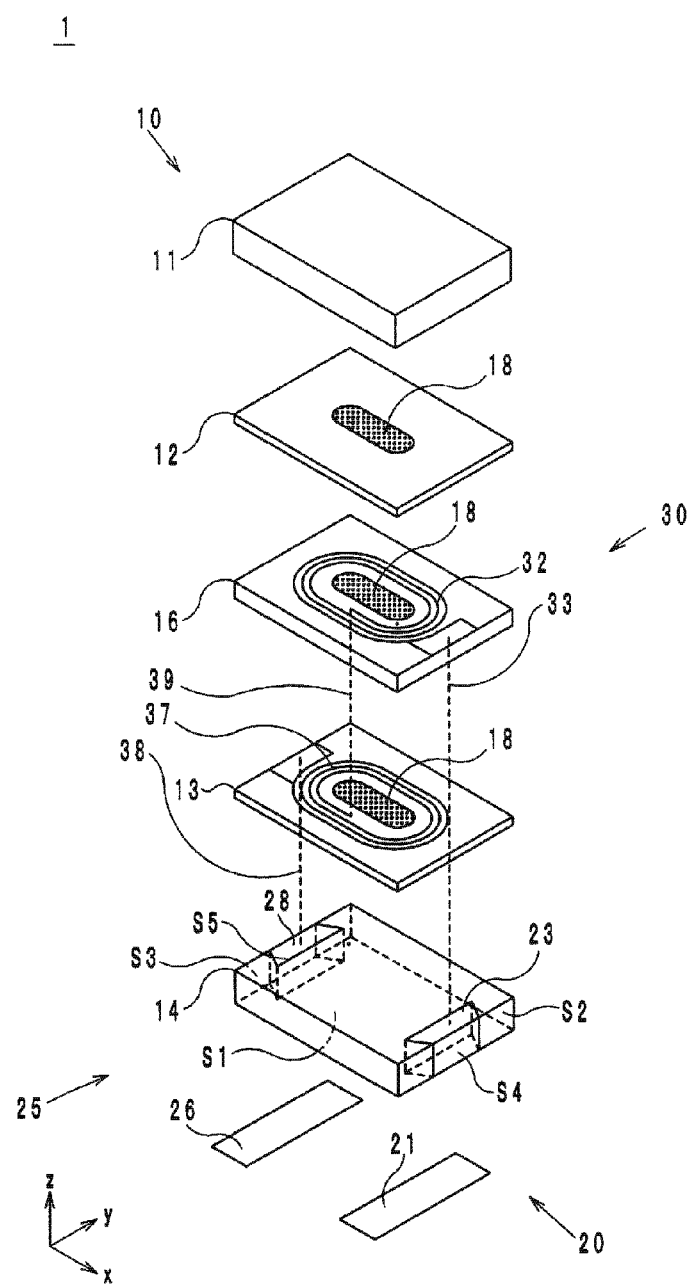
FIG. 2 is an exploded perspective view showing the internal structure of the electronic component according to the first embodiment.

As shown in FIG. 2, the main body 10 includes an element assembly composed of insulator layers 11 to 14, an insulator substrate 16, and a magnetic path 18. Also, in the main body 10, the insulator layers 11 and 12, the insulator substrate 16, and the insulator layers 13 and 14 are stacked in this order from the positive direction side toward the negative direction side in the z-axis direction.

The insulator layers 11 and 14 are composed of, for example, an epoxy resin containing a metal magnetic powder. In the present embodiment, in order to increase the density of the metal magnetic powder in the insulator layer, the insulator layers 11 and contain two types of metal magnetic powders having different particle diameters. Specifically, a mixed powder of a magnetic powder (maximum particle diameter of 100 μm) composed of an Fe—Si—Cr alloy having an average particle diameter of 80 μm and a magnetic powder composed of carbonyl Fe having an average particle diameter of 3 μm is employed. In this regard, the metal magnetic powders may include a powder of Fe or an alloy containing Fe. Examples of the Fe alloys include Fe—Si alloys, Fe—Si—Cr alloys, and Fe—Si—Al alloys. Also, an insulating coating serving as an insulating film composed of a metal oxide is applied to these powders in advance by employing a chemical conversion treatment. The insulating film is composed of, for example, a silicon resin, glass, or a metal oxide. Further, in consideration of the L value and direct current superposition characteristics of the electronic component 1, 90 percent by weight or more of metal magnetic powder is contained in the insulator layers 11 and 14. In this regard, the resin contained in the insulator layers 11 and 14 may be an insulating inorganic material, e.g., a glass ceramic, or a polyimide resin. Also, the material for forming the insulator layers 11 and 14 can be specified to be only the metal magnetic powder.

Then, the insulator layer 11 is located at the end portion on the positive direction side in the z-axis direction of the main body 10. Also, the insulator layer 14 is located at the end portion on the negative direction side in the z-axis direction of the electronic component 1, and a bottom surface S1 that is a surface on the negative direction side in the z-axis direction of the insulator layer 14 is a mounting surface when the electronic component 1 is mounted on a circuit board. In this regard, the thicknesses of the insulator layers 11 and 14 in the present embodiment are about 60 μm and are smaller than the maximum particle diameter of the metal magnetic powder contained in the insulator layers 11 and 14.

The insulator layers 12 and 13 are composed of an epoxy resin or the like. Also, the insulator layer 12 is located on the negative direction side in the z-axis direction with respect to the insulator layer 11, and the insulator layer 13 is located on the positive direction side in the z-axis direction with respect to the insulator layer 14. In this regard, the material for forming the insulator layers 12 and 13 may be an insulating resin, e.g., benzocyclobutene, or an insulating inorganic material, e.g., a glass ceramic.

The insulator substrate 16 is a printed wiring board, in which a glass cloth is impregnated with an epoxy resin, and is interposed between the insulator layer 12 and the insulator layer 13 in the z-axis direction. In this regard, the material for forming the insulator substrate 16 may be an insulating resin, e.g., benzocyclobutene, or an insulating inorganic material, e.g., a glass ceramic.

The magnetic path 18 is composed of a resin containing a magnetic powder located inside the main body 10 almost at the center. Here, in the present embodiment, in consideration of the L value and direct current superposition characteristics of the electronic component 1, 90 percent by weight or more of magnetic powder is contained. Further, in order to enhance the filling properties of the magnetic path 18, two types of magnetic powders having different particle sizes are mixed as the magnetic powder. Also, the magnetic path 18 penetrates the insulator layers 12 and 13 and the insulator substrate 16 in the z-axis direction, and the cross-section has an oval, columnar shape. Further, the magnetic path 18 is disposed so as to be located on inner circumferences of coils 32 and 37 described later.

Figure 3:
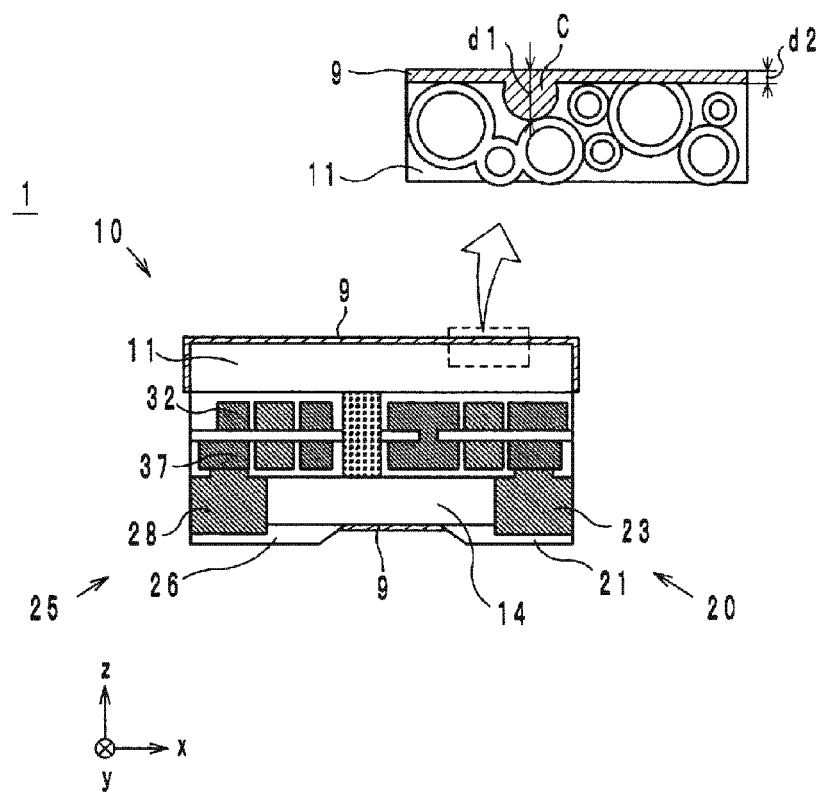
FIG. 3 is a sectional view of the electronic component according to the first embodiment.

Meanwhile, the surface of the main body 10, that is, the surfaces of the insulator layers 11 and 14, together with the metal magnetic powder exposed at the surfaces are covered with the coating film 9, as shown in FIG. 3. However, the coating film 9 is not present at the interfaces between the insulator layers 11 and 14 and the outer electrodes 20 and 25 described later. In addition, the coating film 9 contains Fe, which is an element constituting the metal magnetic powder contained in an acrylic resin and the insulator layers 11 and 14. Then, the acrylic resin contained in the coating film 9 has a cross-linked structure. Meanwhile, a higher thermal decomposition temperature is preferable in consideration of the use of solder at the time of mounting the electronic component 1 onto a circuit board. For example, in the case where the thermal decomposition temperature is set to be a temperature at which about 5% of the mass of the resin constituting the coating film 9 decreases, the thermal decomposition temperature is 240° C. or higher. Here, the thermal decomposition temperature can be measured using the following analyzer under the following conditions.

Analyzer: TG-DTA 2000SA (produced by NETZSCH Japan K.K.)
Analysis conditions
    Temperature profile: RT→300° C. (10° C./min)
    Measurement atmosphere: reduced pressure (rotary pump is used: 0.1 Pa)
    Sample container (cell) material: Al
    Measurement sample weight: 100 mg Also, an example of analytical methods for examining ions (cations) of the element constituting the metal magnetic powder contained in the coating film 9 is X-ray photoelectron spectroscopy (XPS). The measurement conditions of XPS are as described below.

Measurement apparatus: PHI 5000 VersaProbe produced by ULVAC-PHI, Inc.
X-ray source: Al—Kα rays
Measurement region: 100 μmϕ
X-ray acceleration energy: 93.9 eV
Time per step of measurement: 100 ms
Number of acquisition of Fe2p: 500
Energy calibration: C1s=284.6 eV When the coating film 9 is analyzed by employing XPS, in an Fe2p3 spectrum, a peak is recognized at about 710 eV, which indicates the presence of Fe cations. On the other hand, no peak is recognized at about 707 eV, which indicates the presence of Fe metal. Consequently, the presence of ions (cations) of an element constituting the metal magnetic powder contained in the coating film 9 can be verified.

In this regard, the resin components contained in the coating film 9 may be epoxy resins, polyimide resins, silicone resins, polyamide imide resins, polyether ether ketone resins, fluororesins, acryl silicone resins, and the like besides the acrylic resins. Examples of resin components other than those described above contained in the coating film 9 include acrylic resin emulsions of methyl methacrylate resins, acrylonitrile-styrene-acryl copolymers, and styrene-acryl copolymers. Examples of specific product names include Nipol SX1706A, SX1503A, LX814, and LX855EX by ZEON Corporation and Neocryl A-639, A-655, and A6015 by Kusumoto Chemicals, Ltd.

Meanwhile, there is no particular limitation regarding monomers used for the resin component contained in the coating film 9, and examples thereof include (meth)acrylic acid, methyl acrylate, ethyl acrylate, n-butyl acrylate, isobutyl acrylate, t-butyl acrylate, dodecyl acrylate, stearyl acrylate, 2-ethylhexyl acrylate, tetrahydrofurfuryl acrylate, diethylaminoethyl acrylate, 2-hydroxyethyl acrylate, 2-hydroxypropyl acrylate, methyl methacrylate, propyl methacrylate, n-butyl methacrylate, isobutyl methacrylate, t-butyl methacrylate, n-octyl methacrylate, dodecyl methacrylate, 2-ethylhexyl methacrylate, stearyl methacrylate, diethylaminoethyl methacrylate, 2-hydroxyethyl methacrylate, 2-hydroxypropyl methacrylate, (meth)acrylic acid glycol esters, e.g., ethylene glycol mono(meth)acrylate and polyethylene glycol mono(meth)acrylate, alkyl vinyl ethers, e.g., methyl vinyl ethers and ethyl vinyl ethers, vinyl esters, e.g., vinyl acetate, N-alkyl-substituted (meth)acrylamides, e.g., N-methyl acrylamide, N-ethyl acrylamide, N-methyl methacrylamide, and N-ethyl methacrylamide, nitriles, e.g., acrylonitrile and methacrylonitrile, and styrene-based monomers, e.g., styrene, ethylene, butadiene, vinyl chloride, vinylidene chloride, vinyl acetate, p-methyl styrene, and α-methyl styrene. These other monomers may be used alone, or at least two types may be used in combination. (Meth)acryl refers to acryl or methacryl.

Also, the coating film 9 enters recessed portions C generated by falling of the metal magnetic powder contained in the insulator layers 11 and 14 from the insulator layers 11 and 14, and the recessed portions C are almost filled therewith. As a result, the thickness d1 of the coating film 9 in the recessed portion C is larger than the thickness d2 of the coating film 9 in other portions of the surface of the main body 10.

As shown in FIG. 1, the outer electrode 20 is disposed on the bottom surface S1 and the side surface S2 on the positive direction side in the x-axis direction of the main body 10 when viewed from outside the main body 10. Also, the outer electrode 20 is composed of a bottom surface electrode 21 made from a composite material of a metal and a resin and a columnar electrode 23 made from Cu. In this regard, examples of other materials usable for the columnar electrode 23 include Au, Ag, Pd, and Ni. Also, the outer electrode 20 produced by an outer electrode forming method, e.g., plating or sputtering, in the related art may be used.

The bottom surface electrode 21 is a so-called resin electrode in which a low-resistance metal powder, that is, a Ag-coated Cu powder having an average particle diameter of 100 nm in the present embodiment, is dispersed in a phenol resin. Also, the bottom surface electrode 21 is a tabular electrode disposed in a region on the positive direction side in the x-axis direction of the bottom surface S1 of the insulator layer 14. Further, the bottom surface electrode 21 has a rectangular shape in plan view when viewed from the negative direction side in the z-axis direction.

Figure 4:
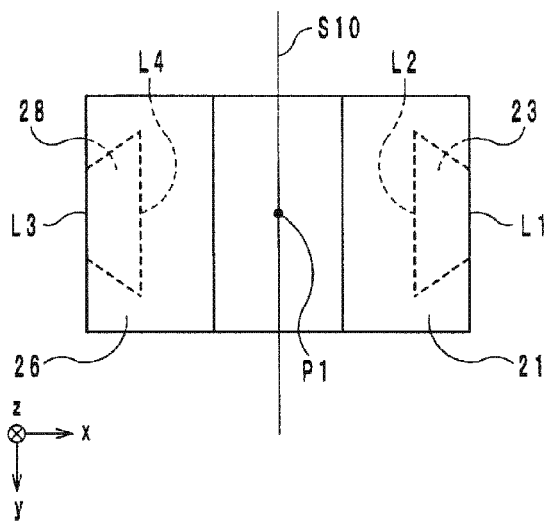
FIG. 4 is a plan view of the electronic component according to the first embodiment, when viewed from the bottom.

The columnar electrode 23 is basically disposed in a region on the positive direction side in the x-axis direction in the main body 10 and is an electrode extending so as to penetrate the insulator layer 14 in the z-axis direction, as shown in FIG. 2. In this regard, as shown in FIG. 1, the side surface S4 on the positive direction side in the x-axis direction of the columnar electrode 23 is exposed at the side surface S2 of the main body 10. Also, as shown in FIG. 4, the columnar electrode 23 has a trapezoidal shape, in which an outer edge L1 exposed at the side surface S2 is specified as an upper base and an outer edge L2 located at the innermost side of the main body 10 is specified as a lower base, in plan view when viewed from the z-axis direction. In this regard, the outer edge L2 is longer than the outer edge L1. Further, in the plan view of the columnar electrode 23 when viewed from the z-axis direction, the columnar electrode 23 falls within the bottom surface electrode 21. In addition to this, the area of the side surface S4 of the columnar electrode 23 is smaller than the area of the bottom surface electrode 21. Then, as shown in FIG. 3, the surface on the negative direction side in the z-axis direction of the columnar electrode 23 (hereafter "surface on the negative direction side in the z-axis direction" is referred to as a lower surface) is in contact with the surface on the positive direction side in the z-axis direction of the bottom surface electrode 21 (hereafter "surface on the positive direction side in the z-axis direction" is referred to as an upper surface).

The outer electrode 25 is an electrode having the same shape as the shape of the outer electrode 20 and is arranged such that the outer electrode 25 and the outer electrode 20 becomes symmetric with respect to a plane S10 that passes through the central point P1 of the bottom surface S1 and is parallel to the z-axis and the y-axis. That is, as shown in FIG. 1, the outer electrode 25 is disposed on the bottom surface S1 and the side surface S3 on the negative direction side in the x-axis direction of the main body 10 when viewed from outside the main body 10. Then, the outer electrode 25 is composed of a bottom surface electrode 26 made from the same material for the bottom surface 21 electrode and a columnar electrode 28 made from Cu or the like.

The circuit element 30 serving as an inner conductor is located inside the element assembly in the main body 10 and is composed of an electrically conductive material, e.g., Au, Ag, Cu, Pd, or Ni. Also, the circuit element 30 serving as the inner conductor is composed of a coil 32, a via conductor 33, a coil 37, and via conductors 38 and 39.

As shown in FIG. 2, the coil 32 is disposed on the upper surface of the insulator substrate 16 and is a spiral conductor that approaches the center while spiraling clockwise in plan view when viewed from the positive direction side in the z-axis direction. Also, one end on the outer circumference side of the coil 32 extends toward the side surface S2 of the main body 10. In this regard, the cross-sectional area of the cross-section orthogonal to the direction of spiraling of the coil 32 is smaller than the cross-sectional area of the cross-section orthogonal to the z-axis direction, which is the extension direction of the columnar electrodes 23 and 28.

The via conductor 33 connects one end on the outer circumference side of the coil 32 to the columnar electrode 23. Therefore, the via conductor 33 penetrates the insulator substrate 16 and the insulator layer 13 in the z-axis direction.

The coil 37 is disposed on the lower surface of the insulator substrate 16, that is, the upper surface of the insulator layer 13, and is a spiral conductor that trends from the center toward the outer side portion while spiraling clockwise in plan view when viewed from the positive direction side in the z-axis direction. Also, one end on the outer circumference side of the coil 37 extends toward the side surface S3 of the main body 10. Further, the other end on the inner circumference side of the coil 37 is disposed so as to overlap the other end on the inner circumference side of the coil 32 when viewed from the z-axis direction. In this regard, the cross-sectional area of the cross-section orthogonal to the direction of spiraling of the coil 37 is smaller than the cross-sectional area of the cross-section orthogonal to the z-axis direction, which is the extension direction of the columnar electrodes 23 and 28.

The via conductor 38 connects one end on the outer circumference side of the coil 37 to the columnar electrode 28. Therefore, the via conductor 38 penetrates the insulator layer 13 in the z-axis direction.

The via conductor 39 penetrates the insulator substrate 16 in the z-axis direction and connects the other end on the inner circumference side of the coil 32 to the other end on the inner circumference side of the coil 37.

The thus configured electronic component 1 functions as an inductor, where signals input from the outer electrode 20 or the outer electrode 25 are output from the outer electrode 20 or the outer electrode 25 through the circuit element 30.

(Manufacturing Method, Refer to FIG. 5 to FIG. 17)

A method for manufacturing the electronic component 1 according to the first embodiment will be described. The z-axis direction used in the explanation of the manufacturing method is the direction orthogonal to the bottom surface of the electronic component 1 produced by the manufacturing method.

Figure 5:
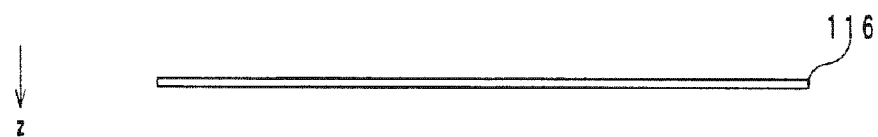
FIG. 5 is a diagram showing a production process of the electronic component according to the first embodiment.
Figure 6:
FIG. 6 is a diagram showing the production process of the electronic component according to the first embodiment.

Initially, as shown in FIG. 5, a mother insulator substrate 116 serving as the plurality of insulator substrates 16 is prepared. Subsequently, as shown in FIG. 6, a plurality of through holes H1 for disposing via conductors 39 are formed in the mother insulator substrate 116 by laser beam machining or the like. In this regard, in order to enhance the acquisition efficiency of the inductance value, the thickness of the insulator substrate is preferably 60 μm or less.

Figure 7:
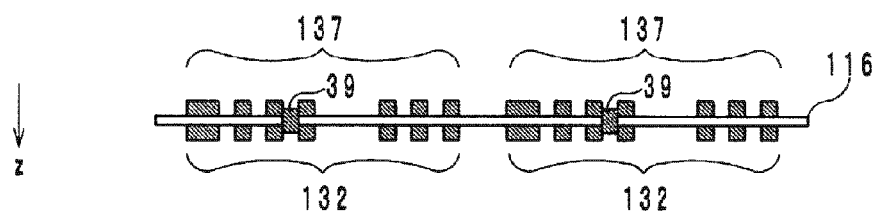
FIG. 7 is a diagram showing the production process of the electronic component according to the first embodiment.

Then, as shown in FIG. 7, the upper surface and the lower surface of the mother insulator substrate 116 provided with the plurality of through holes are subjected to Cu plating. At this time, the through holes are also subjected to plating so as to form a plurality of via conductors 39. Thereafter, a plurality of conductor patterns 132 and 137 corresponding to the coils 32 and 37 are formed on the upper surface and the lower surface of the mother insulator substrate 116 by photolithography.

Figure 8:
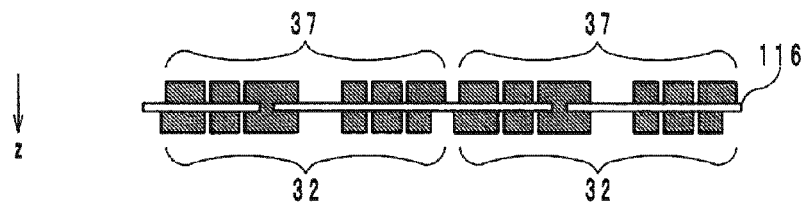
FIG. 8 is a diagram showing the production process of the electronic component according to the first embodiment.

After the plurality of conductor patterns 132 and 137 are formed, Cu plating is further applied so as to obtain a plurality of coils 32 and 37 having sufficient diameters, as shown in FIG. 8.

Figure 9:
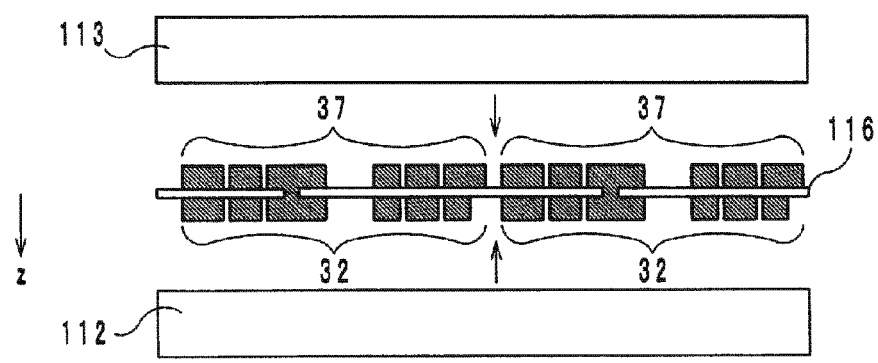
FIG. 9 is a diagram showing the production process of the electronic component according to the first embodiment.

Subsequently, as shown in FIG. 9, the mother insulator substrate 116 provided with the plurality of coils 32 and 37 is interposed between insulator sheets 112 and 113 serving as the plurality of insulator layers 12 and 13 in the z-axis direction. In this regard, it is preferable that the step of interposing the coils between the insulator sheets 112 and 113 be performed in a vacuum for the purpose of making the insulator sheets enter very small gaps between the coils. In addition to this, in order to suppress generation of stray capacitance resulting from the coils 32 and 37, the relative dielectric constant of the insulator sheets 112 and 113 is preferably 4 or less.

Figure 10:
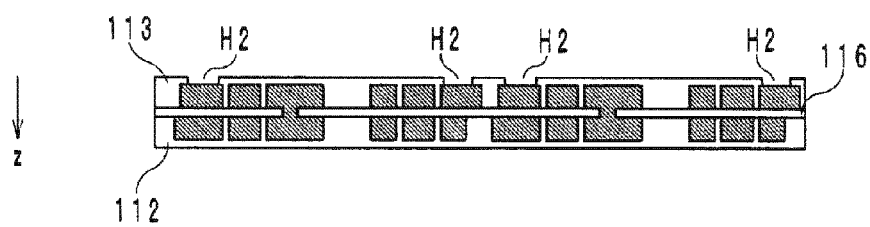
FIG. 10 is a diagram showing the production process of the electronic component according to the first embodiment.

Then, as shown in FIG. 10, a plurality of through holes H2 for disposing via conductors 33 and 38 are formed in the insulator sheet 113 by laser beam machining or the like. Further, in order to remove smears generated by formation of the through holes, desmearing is performed.

After desmearing is performed, first, the insulator sheet 113 is subjected to electroless Cu plating. The electroless plating is for the purpose of forming a seed layer for electrolytic Cu plating performed thereafter. After the seed layer is formed, the insulator sheet 113 is subjected to electrolytic Cu plating. Consequently, the surface of the insulator sheet 113 and the through holes are subjected to plating so as to dispose a plurality of via conductors 33 and 38.

Figure 11:
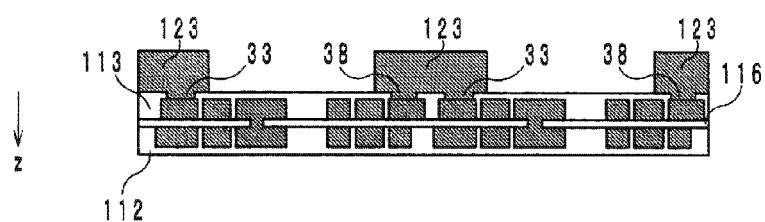
FIG. 11 is a diagram showing the production process of the electronic component according to the first embodiment.
Figure 12:
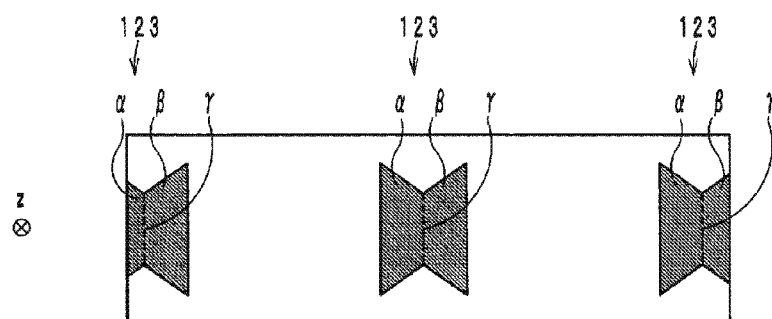
FIG. 12 is a plan view of a columnar electrode at a production stage, when viewed from the bottom.

Thereafter, as shown in FIG. 11, a plurality of conductor patterns 123 having sufficient diameters corresponding to the columnar electrodes 23 and 28 are formed on the insulator sheet 113 by photolithography and Cu plating. Here, as shown in FIG. 12, one conductor pattern 123 has a shape, in which upper bases of two trapezoids α and β that are symmetric with respect to a line are bonded to each other, where the upper bases serve as a symmetry axis γ, when viewed from the z-axis direction.

Figure 13:
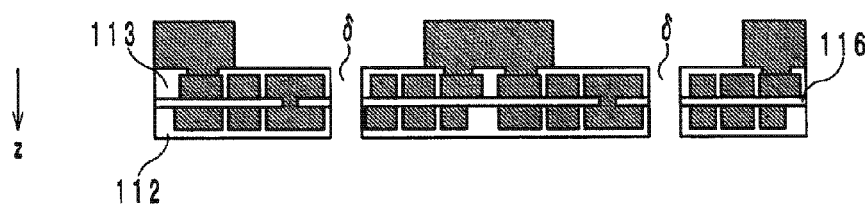
FIG. 13 is a diagram showing the production process of the electronic component according to the first embodiment.

Subsequently, as shown in FIG. 13, in order to dispose magnetic paths 18, a plurality of through holes δ that penetrate the mother insulator substrate 116 and insulator sheets 112 and 113 in the z-axis direction are formed by laser beam machining or the like. In this regard, the locations of formation of through holes δ are an inner circumference side of each of the plurality of coils 32 and 37 disposed on the mother insulator substrate 116 in the xy plane.

Figure 14:
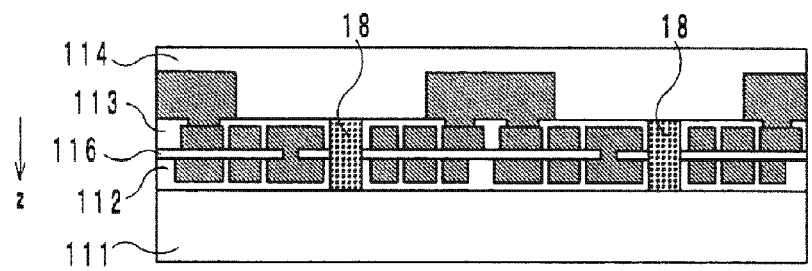
FIG. 14 is a diagram showing the production process of the electronic component according to the first embodiment.

Then, as shown in FIG. 14, a multilayer body, in which the insulator sheet 112, the mother insulator substrate 116, and the insulator sheet 113 are stacked in this order, is interposed between metal magnetic powder-containing resin sheets 111 and 114 corresponding to the insulator layers 11 and 14 in the z-axis direction and pressure bonding is performed in the same manner as in the case of the insulator sheets 112 and 113 shown in FIG. 9. At this time, the metal magnetic powder-containing resin sheet 111 is pressure-bonded from the insulator sheet 112 side, and the metal magnetic powder-containing resin sheet 114 is pressure-bonded from the insulator sheet 113 side. Also, the metal magnetic powder-containing resin sheets 111 and 114 enter the plurality of through holes δ by the pressure bonding so as to dispose the plurality of magnetic paths 18. Thereafter, a heat treatment is performed by using a constant temperature bath, e.g., an oven, so as to cause curing.

Figure 15:
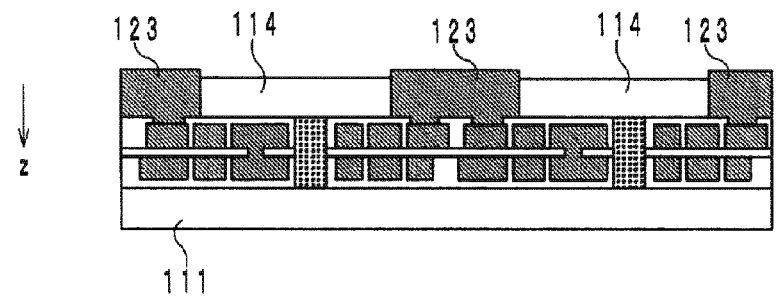
FIG. 15 is a diagram showing the production process of the electronic component according to the first embodiment.

Subsequently, the surface of the resin sheet 114 is ground by buffing, lapping, a grinder, and the like. Consequently, as shown in FIG. 15, the conductor patterns 123 are exposed at the surface of the resin sheet 114. In this regard, the surface of the resin sheet 111 may be ground for adjusting the thickness when the resin sheet 114 is ground.

Figure 16:
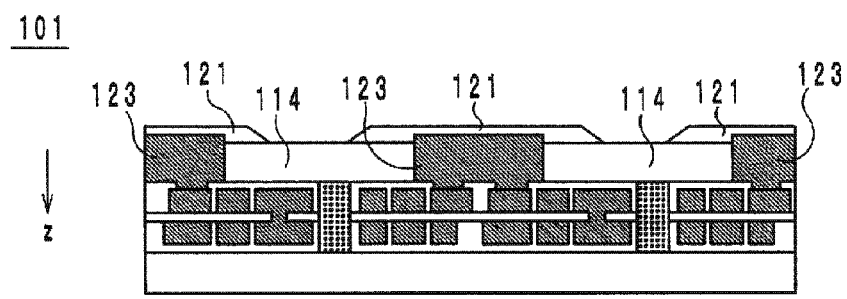
FIG. 16 is a diagram showing the production process of the electronic component according to the first embodiment.

The conductor patterns 123 exposed at the surface of the resin sheet 114 are coated with a phenol resin, in which Ag-coated Cu powder having an average particle diameter of 100 nm is dispersed, by screen printing, and drying is performed so as to dispose a plurality of resin electrode patterns 121 corresponding to bottom surface electrodes 21 and 26 on the surface of the resin sheet 114, as shown in FIG. 16. Consequently, a mother substrate 101 that is an aggregate of a plurality of electronic components is completed.

Figure 17:
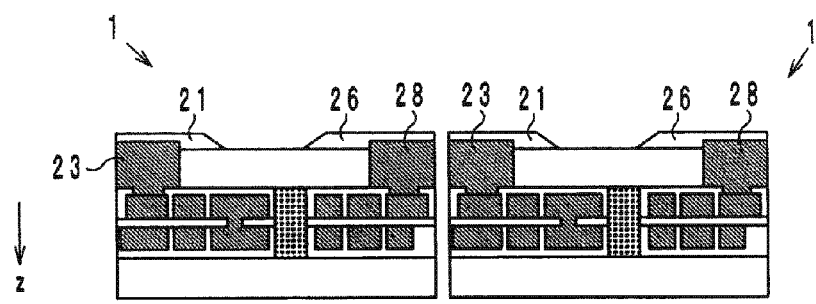
FIG. 17 is a diagram showing the production process of the electronic component according to the first embodiment.

Thereafter, the mother substrate 101 is divided into the plurality of electronic components. Specifically, as shown in FIG. 17, the mother substrate 101 is divided into the plurality of electronic components by cutting the mother substrate 101 with a dicer or the like such that the symmetry axis γ, as shown in FIG. 12, located at the center of the conductor pattern 123 agrees with a cut line when viewed from the z-axis direction. At this time, the conductor pattern 123 is divided into two parts where the center is the symmetry axis γ, and these serve as columnar conductors 23 and 28. In addition, the resin electrode pattern 121 is also divided into the bottom surface electrodes 21 and 26.

The plurality of electronic components obtained in the previous step are dipped into a mixed solution (resin emulsion) containing commercially available latex, in which an etching component and a resin component are dispersed in an aqueous solvent, mixed with an etching-facilitation component and a surfactant. A specific example of composition of the mixed solution is shown in Table 1. The surface of each electronic component is etched by the dipping. The etching is caused by actions of sulfuric acid and hydrogen peroxide contained in the mixed solution. In this regard, sulfuric acid is the etching component and hydrogen peroxide is the etching-facilitation component. In the case where hydrogen peroxide is contained as the etching-facilitation component, ionization of the metal easily proceeds, and formation of the coating film 9 is facilitated. In this regard, no etching-facilitation component may be contained in the mixed solution.

TABLE 1

| Name of material | Amount (ml/l) |
| --- | --- |
| NipolLATEX SX-1706A | 100 |
| ELEMINOL JS-2 | 35 |
| 5% Sulfuric acid | 50 |
| 30% Aqueous hydrogen peroxide | 2 |
| Pure water | 813 |

Also, Fe, which is a cationic element serving as a constituent element of the insulator layers 11 and 14, is ionized by the etching. Further, the ionized cationic element reacts with a resin component contained in an acryl-ester copolymer (NipolLATEX SX-1706A (produced by ZEON Corporation)) in the mixed solution. As a result, the resin component in the mixed solution is neutralized and deposited on the surface of the main body 10 constituting the electronic component, and the main body 10 is covered with the coating film 9. However, the outer electrodes 20 and 25 are not covered with the coating film 9. This is because the electrically conductive material, e.g., Cu, which is the constituent element of the outer electrodes 20 and 25, is a noble element relative to Fe and is hardly ionized and, as a result, the electrically conductive material does not easily react with the resin component. Also, the material for forming the circuit element 30 serving as the inner conductor is an electrically conductive material, e.g., Cu, and, therefore, the circuit element 30 is not covered with the coating film 9 as in the cases of the outer electrodes 20 and 25. In this regard, ELEMINOL JS-2 (produced by Sanyo Chemical Industries, Ltd.) contained in the mixed solution is a surfactant for adjusting the amount of reaction between Fe and the resin component.

Thereafter, washing with pure water and draining are performed, and the coating film 9 is heat-treated. The resin components contained in the coating film 9 are cross-linked with Fe interposed therebetween or the resin components are cross-linked with each other by the heat treatment.

In this regard, the resin component used for producing the coating film 9 may be epoxy resins, polyimide resins, silicone resins, polyamide imide resins, polyether ether ketone resins, fluororesins, acryl silicone resins, and the like besides the acrylic resin. In addition to them, examples of resin components contained in the coating film 9 include acrylic resin emulsions of methyl methacrylate resins, acrylonitrile-styrene-acryl copolymers, styrene-acryl copolymers, and the like. Examples of specific product names include Nipol SX1706A, SX1503A, LX814, and LX855EX by ZEON Corporation and Neocryl A-639, A-655, and A6015 by Kusumoto Chemicals, Ltd.

Meanwhile, there is no particular limitation regarding monomers used for the resin component contained in the coating film 9, and examples thereof include (meth)acrylic acid, methyl acrylate, ethyl acrylate, n-butyl acrylate, isobutyl acrylate, t-butyl acrylate, dodecyl acrylate, stearyl acrylate, 2-ethylhexyl acrylate, tetrahydrofurfuryl acrylate, diethylaminoethyl acrylate, 2-hydroxyethyl acrylate, 2-hydroxypropyl acrylate, methacrylic acid, methyl methacrylate, propyl methacrylate, n-butyl methacrylate, isobutyl methacrylate, t-butyl methacrylate, n-octyl methacrylate, dodecyl methacrylate, 2-ethylhexyl methacrylate, stearyl methacrylate, diethylaminoethyl methacrylate, 2-hydroxyethyl methacrylate, 2-hydroxypropyl methacrylate, (meth) acrylic acid glycol esters, e.g., ethylene glycol mono(meth) acrylate and polyethylene glycol mono(meth)acrylate, alkyl vinyl ethers, e.g., methyl vinyl ethers and ethyl vinyl ethers, vinyl esters, e.g., vinyl acetate, N-alkyl-substituted (meth) acrylamides, e.g., N-methyl acrylamide, N-ethyl acrylamide, N-methyl methacrylamide, and N-ethyl methacrylamide, nitriles, e.g., acrylonitrile and methacrylonitrile, and styrene-based monomers, e.g., styrene, ethylene, butadiene, vinyl chloride, vinylidene chloride, vinyl acetate, p-methyl styrene, and α-methyl styrene. These other monomers may be used alone, or at least two types may be used in combination. (Meth)acryl refers to acryl or methacryl.

A polymerization initiator used in the step of producing the mixed solution (resin emulsion) has no influence on the characteristics of the coating film 9. Also, there is no particular limitation regarding the polymerization initiator, and any known polymerization initiator can be used. Examples of polymerization initiators include ammonium persulfate, potassium persulfate, t-butylhydroperoxide and, in addition, peroxides, e.g., benzoyl peroxide, lauroyl peroxide, di-t-butylperoxyhexahydroterephthalate, and t-butylperoxyisobutylate, and azo compounds, e.g., azobisisovaleronitrile and 2,2-azobis-(2-methylpropionate). Polymerization in the production can be executed by performing heating at 40° C. or higher and 90° C. or lower for 2 hours or more and 20 hours or less. Examples of polymerization methods include emulsion polymerization, soap-free emulsion polymerization, and suspension polymerization methods.

There is no particular limitation regarding an aqueous solvent. Examples include water and mixed media of water and water-soluble organic media (alcohols, e.g., methanol, ethanol, propanol, butanol, ethylene glycol, glycerin, and 2,2,4-trimethylpentane-1,3-diol monoisobutyrate, glycol ethers, e.g., ethylene glycol monoethyl ether and ethylene glycol monobutyl ether, esters, e.g., 2-ethoxyethyl acetate, and ketones, e.g., methyl ethyl ketone).

The etching component may be sulfuric acid, hydrofluoric acid, nitric acid, hydrochloric acid, phosphoric acid, and carboxylic acid (for example, acetic acid). Among them, sulfuric acid, nitric acid, hydrochloric acid, hydrofluoric acid, and acetic acid are particularly preferably used because the film formation property of the coating film 9 is improved. Also, the etching component may be at least two types selected from hydrofluoric acid, sulfuric acid, acetic acid, nitric acid, and hydrochloric acid.

Also, it is preferable that the etching-facilitation component include an oxidizing agent. Specifically, it is preferable that hydrogen peroxide or a peroxodisulfate be contained as the oxidizing agent. An example of the peroxodisulfate is sodium peroxodisulfate.

In this regard, iron fluoride may be mixed as an additive. In the case where iron fluoride is contained as an additive, there is a good balance between cations generated by etching with the resin emulsion and deactivation of the surfactant, and a uniform coating film can be formed.

Anionic surfactants and nonionic surfactants are used as the surfactant, and anionic surfactants are particularly preferable. Examples of anionic surfactants include fatty acid oils, e.g., sodium oleate and castor oil potassium, alkylsulfuric acid ester salts, e.g., sodium lauryl sulfate and ammonium lauryl sulfate, alkylbenzenesulfonates, e.g., sodium dodecylbenzenesulfonate, alkylnaphthalenesulfonates, alkanesulfonates, dialkylsulfosuccinates, alkylphosphoric acid ester salts, naphthalenesulfonic acid formalin condensates, polyoxyethylene alkylphenyl ether sulfuric acid ester salts, and polyoxyethylene alkylsulfuric acid ester salts. The above-described surfactants may be used alone or in combination of at least two types. In particular, in the case where the anionic surfactant has a sulfonic acid group, the degree of deactivation of the surfactant is appropriate. In this regard, if the surfactant is not easily deactivated, no coating film is formed. If the surfactant is too easily deactivated, the resin emulsion becomes unstable and is not easily handled.

Meanwhile, examples of nonionic surfactants include polyoxyethylene alkyl ethers (alkyl group; octyl, decyl, lauryl, stearyl, oleyl, and the like), polyoxyethylene alkylphenyl ethers (alkyl group; octyl, nonyl, and the like), and polyoxyethylene•polyoxypropylene block copolymers.

Also, water-soluble resins having a sulfonic acid group or a salt thereof, a carboxylic acid or a salt thereof, a phosphoric acid group or a salt thereof, or the like are included.

Further, for the purpose of enhancing the coating film strength and the chemical resistance of the coating film 9, additional treatments may be performed such that curing agents, for example, amine compounds, e.g., ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamine, ethanolamine, diethanolamine, and triethanolamine, amino resins, e.g., melamine resins, guanamine resins, and urea resins, phenol resins, epoxy resins, and isocyanate compounds are added and a heat treatment is performed.

Finally, in order to improve the wettability of the outer electrodes 20 and 25, the surfaces of the outer electrodes 20 and 25 are subjected to nickel plating and tin plating. The electronic component 1 is completed by the above-described steps.

(Advantages)

In the electronic component 1 according to the first embodiment, the coating film 9 covering the main body 10 is composed of the cationic element contained in the resin and the insulator layers 11 and 14. The coating film 9 having such a configuration is thicker than a coating film formed by employing a phosphate chemical conversion treatment and exhibits excellent abrasion resistance, insulating property, moisture resistance, chemical resistance, and the like. In this regard, the cationic element can be analyzed by using a mapping diagram and an ion strength profile obtained by time-of-flight secondary ion mass spectrometry.

Also, the metal magnetic powder contained in the insulator layers 11 and 14 is provided with an insulating coating composed of a metal oxide in advance by employing a chemical conversion treatment. However, the insulating coating may peel in a grinding step which is one of the production processes of the electronic component 1. Here, in the electronic component 1, the coating film 9 covering the main body 10 is composed of the resin and the cationic element, and the cationic element is generated from the metal magnetic powder contained in the insulator layers 11 and 14 by ionization. Therefore, even in the case where the insulating coating applied to the metal magnetic powder peels because of the grinding step or the like, the cationic element is eluted from the metal magnetic powder during the downstream step so as to form the coating film 9. As a result, the electronic component 1 exhibits an excellent insulating property and rust prevention performance.

In addition, even in the case where the insulating coating applied to the metal magnetic powder peels during the grinding step or the like, the coating film 9 is formed on the metal magnetic powder in the downstream step, and this contributes to miniaturization and reduction in profile of the electronic component 1. Specifically, in order to miniaturize and reduce the profile of the electronic component 1, it is necessary to thin the insulator layers 11 and 14 as much as possible. Therefore, the grinding step is an indispensable step in order to thin the insulator layers 11 and 14. Meanwhile, in the electronic component in the related art, on the fear that the insulating coating peels off the metal magnetic powder because of the chemical conversion treatment, the thickness of the insulator layer containing the metal magnetic powder is made larger than the particle diameter of the metal magnetic powder. However, in the electronic component 1, the thicknesses of the insulator layers 11 and 14 can be made smaller than the particle diameter of the metal magnetic powder because the metal magnetic powder is protected by the coating film 9. As a result, miniaturization and reduction in profile of the electronic component 1 can be realized.

In this regard, in the case where the metal magnetic powder-containing resin is used for the insulator, part of particles of the metal magnetic powder of the machined surface fall by machining, e.g., cutting, and recessed portions C are generated in the surface of the main body 10, specifically in the surfaces of the insulator layers 11 and 14. Generation of the recessed portions C increases the area that is exposed to the air of the main body 10. As a result, the insulator layers 11 and 14 easily absorb moisture in the air. Further, generation of the recessed portions C decreases the distance between the circuit element 30 located inside the element assembly in the main body 10 and the surface of the main body 10. For the above-described reasons, the circuit element 30 is easily corroded because of generation of the recessed portions C. Here, in the case where a coating film is formed by employing the phosphate chemical conversion treatment, as in the case of the electronic component in the related art, the resulting film thickness is small and, therefore, it is difficult to fill the recessed portions C. However, in the electronic component 1, the coating film 9 composed of the cationic element eluted from the insulator layers 11 and 14 and the resin is used rather than the coating film formed by employing the phosphate chemical conversion treatment. Such a coating film 9 is thicker than the coating film formed by employing the phosphate chemical conversion treatment and, therefore, the recessed portions C generated by falling of particles of the metal magnetic powder can be filled. Consequently, in the electronic component 1, corrosion of the circuit element 30 can be suppressed. That is, the electronic component 1 exhibits excellent moisture resistance.

Here, the present inventors performed experiments in order to clarify the effect on the moisture resistance of the electronic component 1. In the experiments, 50 first samples corresponding to the electronic component 1 and 50 second samples, in which the coating film 9 in the electronic component 1 was replaced with the coating film formed by employing the phosphate chemical conversion treatment, were used and the normality of the continuity of each sample was examined at a high temperature and a high humidity. Regarding the specific conditions of the experiment, the temperature was 85° C.±2° C. and the humidity was 85%±2%, and a current of 6 A was passed continuously. Then, 24 hours after start of the experiment, the state of continuity of each sample was examined. That is, regarding the evaluation criteria, a sample that exhibited continuity 24 hours after start of the experiment was rated as non-defective, and a component that exhibited no continuity 24 hours after start of the experiment was rated as defective. According to the results of the experiments, 1 of 50 first samples exhibited no continuity and 16 of 50 second samples exhibited no continuity. That is, the defective rate of the first sample was 2%, and the defective rate of the second sample was 32%. These results indicate that the moisture resistance of the coating film 9 composed of the cationic element and the resin is superior to the moisture resistance of the coating film formed by employing the phosphate chemical conversion treatment.

Meanwhile, the recessed portions C generated by falling of particles of the metal magnetic powder are filled with the coating film 9, and this contributes to the reliability of connection between the outer electrodes 20 and 25 of the electronic component 1 and the circuit board carrying the electronic component 1. Specifically, in the case where recessed portions C are present in the surface of the main body 10 near the outer electrodes 20 and 25, these recessed portions C cannot be filled with the coating film formed by employing the phosphate chemical conversion treatment. As a result, when the outer electrodes 20 and 25 are subjected to the nickel plating and tin plating, a plating liquid enters the interfaces between the outer electrodes 20 and 25 and the main body 10 from the recessed portions C near the outer electrodes 20 and 25, and the outer electrodes 20 and 25 are lifted from the main body 10. If the electronic component in this state is soldered to the circuit board, the fixing force of the electronic component to the circuit board becomes insufficient, the reliability of connection between the outer electrodes 20 and 25 and the circuit board is impaired. On the other hand, in the electronic component 1 according to the first embodiment, the recessed portions C generated by falling of particles of the metal magnetic powder are filled with the coating film 9 and, thereby, the reliability of connection between the outer electrodes 20 and 25 and the circuit board can be maintained.

Figure 18:
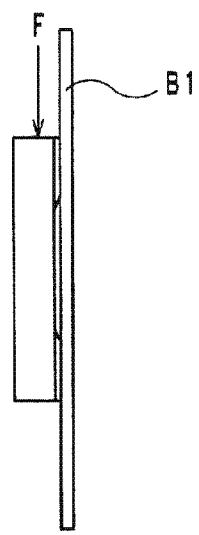
FIG. 18 is a diagram showing the manner of a connection reliability test (fixing force test).

Here, the present inventors performed experiments in order to examine the effect on the reliability of connection of the electronic component 1. In the experiments, initially, 50 first samples and 50 second samples were prepared. Subsequently, each sample was soldered to the circuit board B1. As shown in FIG. 18, each circuit board B1 was stood vertically, and a force F was applied to the side surface of each sample downward in the vertical direction. Then, the force applied to the side surface of each sample was measured at the point in time when each sample came off the circuit board B1.

According to the results of the experiments, the minimum force of the first sample was 32 N, and the minimum force of the second sample was 25 N. That is, these results indicate that the coating film 9 composed of the cationic element and the resin contributes to the reliability of connection between the outer electrodes 20 and 25 of the electronic component 1 and the circuit board carrying the electronic component 1.

Meanwhile, in the production steps of the electronic component 1, a mixed solution containing commercially available latex, in which an etching component and a resin component are dispersed in an aqueous solvent, mixed with an etching-facilitation component and a surfactant is used. Consequently, the coating film 9 can be formed at the same time with etching. Therefore, the production steps of the electronic component 1 are simple compared with the production steps in which a solution of only the etching component and a solution of only the resin component are used separately.

Further, in the production steps of the electronic component 1, when the coating film 9 is formed, Fe contained in the insulator layers 11 and 14 is ionized, whereas the electrically conductive material, e.g., Cu, contained in the outer electrodes 20 and 25, the circuit element 30 serving as the inner conductor, and the like is hardly ionized. As a result, the outer electrodes 20 and 25 and the circuit element 30 are not covered with the coating film 9. That is, in the method for manufacturing the electronic component 1, the coating film 9 can be selectively formed on only a portion in need of coating mainly by utilizing a difference in solubility into the etching component.

(Second Embodiment, Refer to FIG. 19 to FIG. 25)

Different points between an electronic component 1A according to a second embodiment and the electronic component 1 according to the first embodiment are the configurations of the outer electrodes 20 and 25, the configuration of the circuit element 30, the materials for forming the insulator layers 12 and 13, the material for forming the insulator substrate 16, and the location at which the coating film 9 is formed. Specific explanations are as described below.

Figure 19:
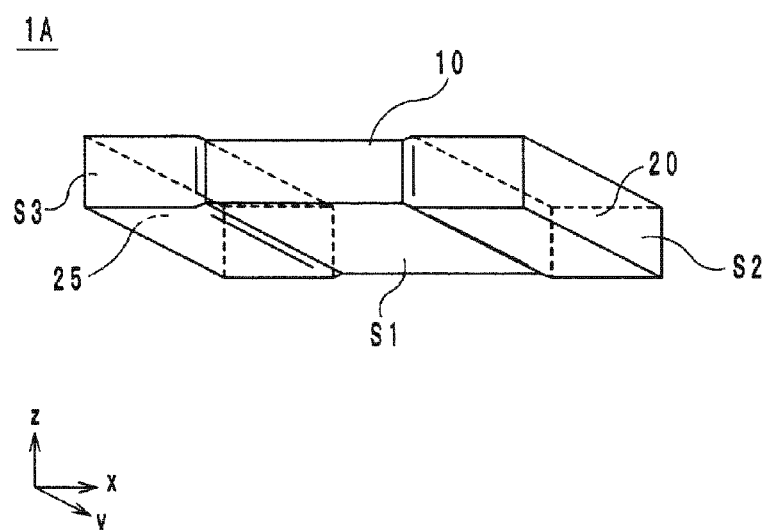
FIG. 19 is a perspective view of an electronic component according to a second embodiment.

As shown in FIG. 19, in the electronic component 1A, the outer electrode 20 is disposed so as to cover the side surface S2 on the positive direction side in the x-axis direction of the main body 10 and part of each of the surfaces surrounding the side surface S2. Also, the outer electrode 25 is disposed so as to cover the side surface S3 on the negative direction side in the x-axis direction of the main body 10 and part of each of the surfaces surrounding the side surface S3.

Figure 20:
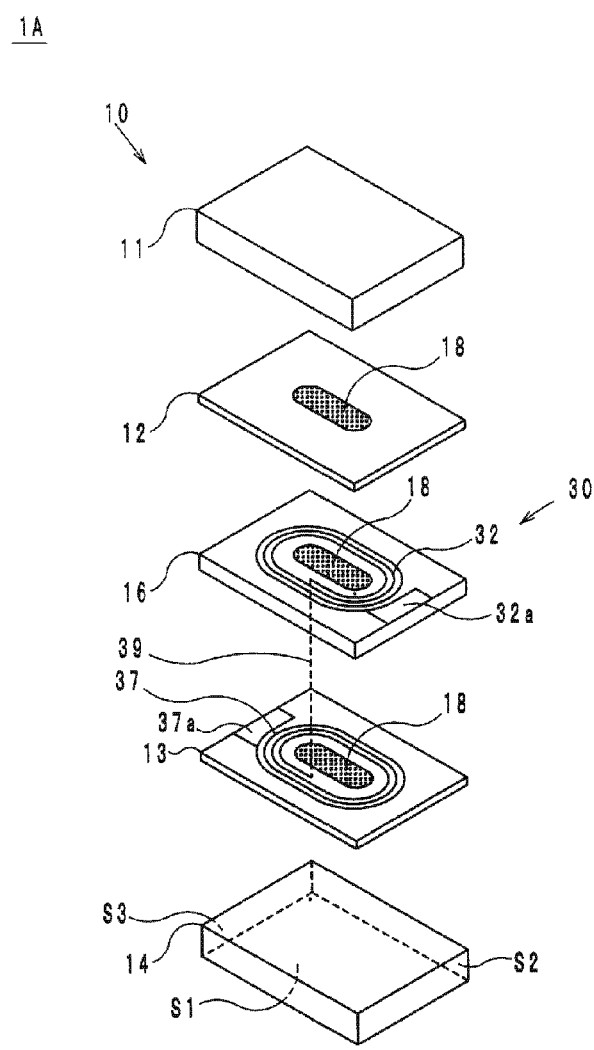
FIG. 20 is an exploded perspective view showing the internal structure of the electronic component according to the second embodiment.
Figure 21:
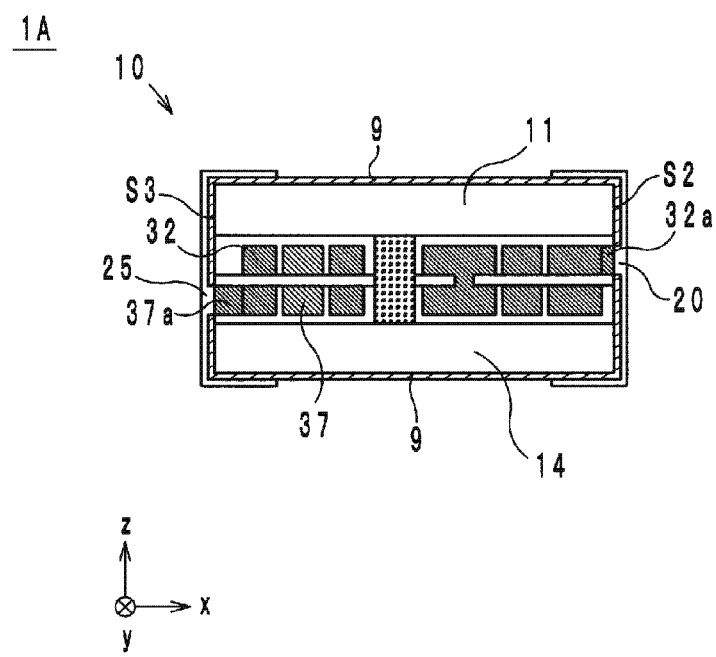
FIG. 21 is a sectional view of the electronic component according to the second embodiment.

Further, as shown in FIG. 20, the via conductor 33 is not present in the electronic component 1A. Instead, as shown in FIG. 21, one end 32a on the outer circumference side of the coil 32 serving as the inner conductor is exposed at the side surface S2 of the main body 10. Consequently, the coil 32 is connected to the outer electrode 20. Also, as shown in FIG. 20, the via conductor 38 is not present in the electronic component 1A. Instead, as shown in FIG. 21, one end 37a on the outer circumference side of the coil 37 serving as the inner conductor is exposed at the side surface S3 of the main body 10. Consequently, the coil 37 is connected to the outer electrode 25.

Then, in the electronic component 1A, the material for forming the insulator layers 12 and 13 and the material for forming the insulator layer 16 are composed of the same metal magnetic powder-containing resin as the material for forming the insulator layers 11 and 14.

Figure 22:
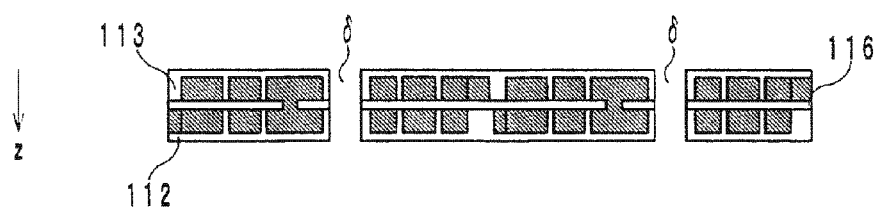
FIG. 22 is a diagram showing a production process of the electronic component according to the second embodiment.

Meanwhile, in the electronic component 1A, the configurations of the outer electrodes 20 and 25 and the like are different from those in the electronic component 1 and, therefore, the manufacturing method is partly different. In production of the electronic component 1A, a mother insulator substrate 116 provided with a plurality of coils 32 and 37 is interposed between two insulator sheets 112 and 113 as in the case shown in FIG. 9. Thereafter, the through holes δ for forming the magnetic paths 18 are formed, as shown in FIG. 22. In this regard, the material for constituting the mother insulator substrate 116 and the insulator sheets 112 and 113 is the metal magnetic powder-containing resin.

Figure 23:
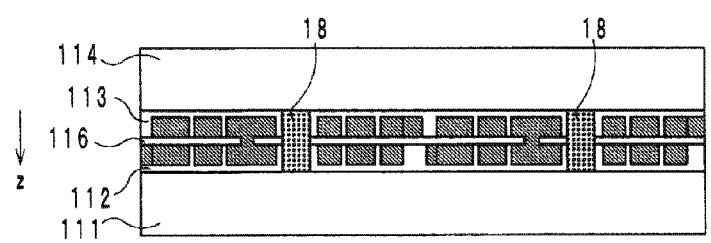
FIG. 23 is a diagram showing the production process of the electronic component according to the second embodiment.

Subsequently, as shown in FIG. 23, the multilayer body, in which the insulator sheet 112, the mother insulator substrate 116, and the insulator sheet 113 are stacked in this order, is interposed between the insulator sheets 111 and 114 in the z-axis direction and pressure bonding is performed, as in the case of the insulator sheets 112 and 113 shown in FIG. 9. The metal magnetic powder-containing resin sheets 111 and 114 enter the plurality of through holes δ by this pressure bonding so as to dispose the plurality of magnetic paths 18. Thereafter, a heat treatment is performed by using a constant temperature bath, e.g., an oven, so as to cause curing.

After the curing, in order to adjust the thicknesses, the surfaces of the resin sheets 111 and 114 are ground by buffing, lapping, a grinder, or the like. Consequently, a mother substrate that is an aggregate of a plurality of electronic components is completed.

Figure 24:
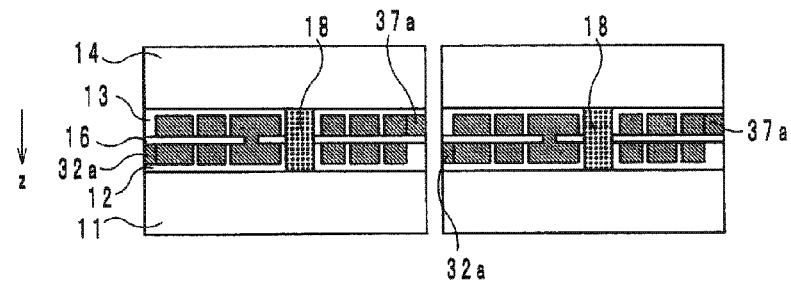
FIG. 24 is a diagram showing the production process of the electronic component according to the second embodiment.
Figure 25:
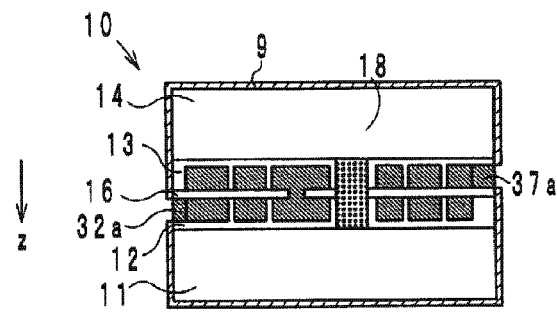
FIG. 25 is a diagram showing the production process of the electronic component according to the second embodiment.

Then, as shown in FIG. 24, the mother substrate is divided into the plurality of electronic components by being cut with a dicer or the like. One end 32a on the outer circumference side of the coil 32 and one end 37a on the outer circumference side of the coil 37 are exposed at the cut surfaces by this division.

The plurality of electronic components obtained in the previous step are dipped into a mixed solution (resin emulsion) containing commercially available latex, in which an etching component and a resin component are dispersed in an aqueous solvent, mixed with an etching-facilitation component and a surfactant. In this regard, no etching-facilitation component may be contained in the mixed solution. Consequently, the surface of the main body 10 constituting the electronic component is covered with the coating film 9. However, the one end 32a on the outer circumference side of the coil 32 and one end 37a on the outer circumference side of the coil 37 are not covered with the coating film 9. This is because the electrically conductive material, e.g., Cu, which is the constituent element of the coils 32 and 37 serving as the inner conductors, is a noble element relative to Fe and is hardly ionized and, as a result, the electrically conductive material does not easily react with the resin component.

Thereafter, washing with pure water and draining are performed, and the coating film 9 is heat-treated. The resin components contained in the coating film 9 are cross-linked with Fe interposed therebetween or the resin components are cross-linked with each other by the heat treatment.

Finally, the outer electrodes 20 and 25 are formed. First, the main body 10 covered with the coating film 9 is coated with an electrode paste composed of an electrically conductive material containing Ag as a primary component. Subsequently, the resulting electrode paste is heat-treated at a temperature of 80° C. to 200° C. for 5 to 12 minutes, for example. The surfaces of the thus formed underlying electrodes of the outer electrodes 20 and 25 are subjected to copper plating, nickel plating, and tin plating so as to form the outer electrodes 20 and 25. The electronic component 1A is completed by the above-described steps.

(Advantages)

In the electronic component 1A having the above-described configuration, the outer electrodes 20 and 25 are disposed after the coating film 9 is formed. Therefore, as shown in FIG. 21, the coating film 9 is present at the interfaces between the main body 10 and the outer electrodes 20 and 25. Here, the reliability of connection between the outer electrodes 20 and 25 of the electronic component 1A and the circuit board carrying the electronic component 1A is improved because the coating film 9 is present at the interfaces between the main body 10 and the outer electrodes 20 and 25. Specific explanations are as described below.

In the case where the metal magnetic powder-containing resin is used for the insulator, part of particles of the metal magnetic powder of the machined surface fall by machining, e.g., cutting, and recessed portions C are generated in the surface of the main body 10. For example, in the second embodiment, recessed portions C are generated in the side surfaces S2 and S3. If the outer electrodes 20 and 25 are formed directly on the recessed portions C, covering of the Ag underlying electrode with the copper plating, nickel plating, and tin plating becomes insufficient. As a result, so-called solder leaching occurs, where almost all copper plating, nickel plating, and tin plating on the recessed portions C are eluted into solder. If solder leaching occurs, the Ag underlying electrode is exposed, connection with solder becomes impossible or insufficient, and the reliability of connection between the outer electrodes 20 and 25 and the circuit board carrying the electronic component 1A is impaired. However, in the electronic component 1A, the recessed portions C are filled with the coating film 9 and, thereby, the Ag underlying electrode is sufficiently covered with the copper plating, nickel plating, and tin plating. Therefore, regarding the electronic component 1A, the reliability of connection between the outer electrodes 20 and 25 of the electronic component 1A and the circuit board carrying the electronic component 1A can be improved because the coating film 9 is present at the interfaces between the main body 10 and the outer electrodes 20 and 25.

Here, the present inventors examined the effect on the reliability of connection of the electronic component 1A by using 50 third samples corresponding to the electronic component 1A. The experiment for examining the reliability of connection was the same as the experiments performed with respect to the first sample and the second sample. According to the results of the experiment, the minimum force of the third sample was 35 N. That is, the result indicates that the coating film 9 composed of the cationic element and the resin improves the reliability of connection between the outer electrodes 20 and 25 of the electronic component 1A and the circuit board carrying the electronic component 1A.

In addition, the present inventors examined the effect on the moisture resistance by using 50 third samples. The experiment for examining the moisture resistance was the same as the experiments performed with respect to the first sample and the second sample. According to the results of the experiment, the defective rate of the third sample was 4%. The result indicates that in the electronic component 1A as well, the moisture resistance of the coating film 9 composed of the cationic element and the resin is superior to the moisture resistance of the coating film formed by employing the phosphate chemical conversion treatment.

Figure 26:
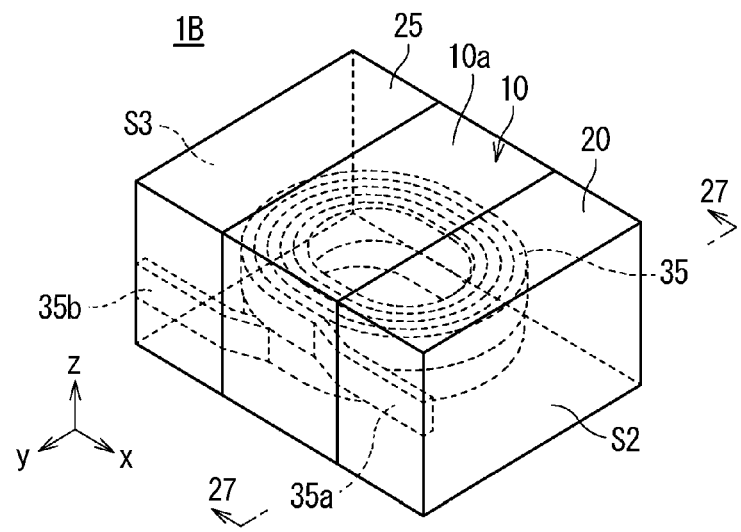
FIG. 26 is a perspective view of an electronic component according to a third embodiment.
Figure 27:
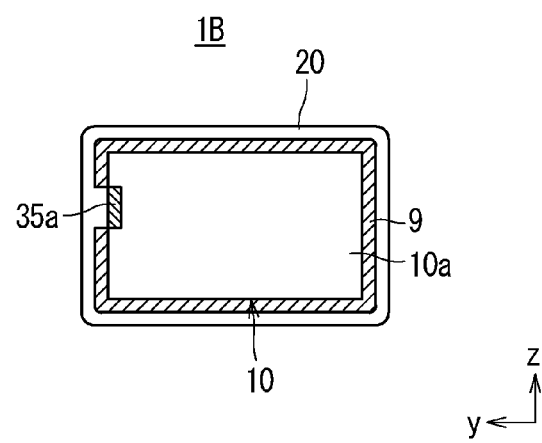
FIG. 27 is a sectional view of the electronic component according to the third embodiment, along a line 27-27 shown in FIG. 26.

(Third Embodiment, Refer to FIG. 26 and FIG. 27)

The present disclosure can further be applied to an electronic component according to a third embodiment, as shown in FIG. 26. FIG. 26 is a perspective view of an electronic component according to the third embodiment. FIG. 27 is a sectional view of the electronic component according to the third embodiment, along a line 27-27 shown in FIG. 26.

As shown in FIG. 26, the electronic component 1B includes a main body 10 and outer electrodes 20 and 25. The main body 10 is formed so as to have a substantially rectangular parallelepiped shape and include an element assembly 10a formed from the same metal magnetic powder-containing resin as in the case of the insulator layers 11 and 14. A coil 35 serving as an inner conductor is included inside the element assembly 10a. The coil 35 is formed by using a conductor wire and is formed by spirally outwardly winding the conductor wire in two stages such that the end portions 35a and 35b of the conductor wire are located at outermost turns. The end portions 35a and 35b of the coil 35 are exposed at the surface (side surface on the positive direction side in the y-axis direction) of the main body 10.

Meanwhile, in the electronic component 1B, as shown in FIG. 26, the outer electrode 20 is disposed so as to cover the side surface S2 on the positive direction side in the x-axis direction of the main body 10 and part of each of the surfaces surrounding the side surface S2. Also, the outer electrode 25 is disposed so as to cover the side surface S3 on the negative direction side in the x-axis direction of the main body 10 and part of each of the surfaces surrounding the side surface S3.

Consequently, the outer electrode 20 is connected to the end portion 35a, and the outer electrode 25 is connected to the end portion 35b. Then, as shown in FIG. 27, the electronic component 1B is configured such that the coating film 9 is present at the interfaces between the main body 10 and the outer electrodes 20 and 25.

Next, a method for manufacturing the electronic component 1B according to the third embodiment will be described.

Initially, the coil 35 serving as an inner conductor is formed and prepared by using a conductor wire.

Thereafter, the coil 35 is interposed between insulator sheets serving as the element assembly 10a and containing the same metal magnetic powder as that in the case of the insulator layers 11 and 14 in the vertical direction by employing a compression molding method so as to form the main body 10. At this time, forming is performed such that the end portions 35a and 35b of the coil 35 are exposed at the surface (side surface on the positive direction side in the y-axis direction) of the main body 10.

Subsequently, a mixed solution (resin emulsion) containing commercially available latex, in which an etching component for ionizing the metal constituting the metal magnetic powder contained in the element assembly 10a and a resin component are dispersed in an aqueous solvent, mixed with an etching-facilitation component and a surfactant is prepared. In this regard, no etching-facilitation component may be contained in the mixed solution. Then, the resulting main body 10 is dipped into the prepared mixed solution. Consequently, the surface of the main body 10 constituting the electronic component is covered with the mixed solution, and the surface of the main body 10 is etched. However, the end portion 35a (35b) of the coil 35 is not etched and, therefore, the coating film 9 is not formed on the surface of the end portion 35a (35b) of the coil 35 (refer to FIG. 27). This is because the electrically conductive material, e.g., Cu, which is the constituent element of the coil 35 serving as the inner conductor, is a noble element relative to Fe and is hardly ionized and, as a result, the electrically conductive material does not easily react with the resin component.

In this regard, as a matter of course, the same material as the material used in the method for manufacturing the electronic component 1 according to the first embodiment can be used for each of the resin component, the aqueous solvent, the etching component, and the surfactant contained in the mixed solution.

Thereafter, washing with pure water and draining are performed, and the main body 10, the surface of which has been etched by being covered with the mixed solution, is subjected to a heat (drying) treatment. The resin components contained in the mixed solution are cross-linked with Fe, which is the metal magnetic powder, interposed therebetween or the resin components are cross-linked with each other by employing the heat treatment and, thereby, the coating film 9 is formed on the surface of the main body 10, as shown in FIG. 27.

Finally, the outer electrodes 20 and 25 are formed on the main body 10 provided with the coating film. First, the main body 10 covered with the coating film 9 is coated with an electrode paste composed of an electrically conductive material containing Ag as a primary component. Subsequently, the resulting electrode paste is heat-treated at a temperature of 80° C. to 200° C. for 5 to 12 minutes, for example. Consequently, the surfaces of the thus formed underlying electrodes of the outer electrodes 20 and 25 are subjected to copper plating, nickel plating, and tin plating so as to form the outer electrodes 20 and 25. The electronic component 1B is completed through the above-described steps.

The electronic component 1B having the above-described configuration exerts the same effects as in the cases of the electronic component 1 or the electronic component 1A. That is, the electronic component 1B according to the third embodiment exhibits excellent reliability of connection and moisture resistance.

Here, the present inventors produced a sample of each of the examples corresponding to the electronic component 1B and the comparative examples. In the sample of each of the examples and the comparative examples, the material and the content of the resin component, the etching component, the surfactant, and the etching-facilitation component contained in the mixed solution (resin emulsion) for forming the coating film 9 were changed variously. In the experimental examples, experiments for examining the reliability of connection and the moisture resistance of the sample of each of the examples and the comparative examples were performed.

EXAMPLES

To begin with, the sample of each of Example 1 to Example 29 shown in Table 2 was produced following the above-described method for manufacturing the electronic component. Here, the coating film 9 was formed by performing dipping into the mixed solution for 5 minutes, performing washing with pure water, and thereafter, performing heating in an oven at 180° C. for 10 minutes so as to cause curing. In each experiment, 100 samples corresponding to the electronic component 1B of each of Example 1 to Example 29 were prepared.

In Example 1, the resin component contained in the mixed solution for forming the coating film 9 was set to be an acryl-ester copolymer (trade name: Nipol SX1706A (produced by ZEON Corporation)), the etching component was set to be sulfuric acid, the surfactant was set to be sodium alkylallylsulfosuccinate (trade name: ELEMINOL JS-2 (produced by Sanyo Chemical Industries, Ltd.)), and the etching-facilitation component and the additive were not contained.

In Example 2, the resin component contained in the mixed solution for forming the coating film 9 was set to be an acryl-ester copolymer (trade name: Nipol SX1706A (produced by ZEON Corporation)), the etching component was set to be sulfuric acid, the surfactant was set to be sodium alkylallylsulfosuccinate (trade name: ELEMINOL JS-2 (produced by Sanyo Chemical Industries, Ltd.)), the additive was set to be iron(III) fluoride, and the etching-facilitation component was not contained.

In Example 3 to Example 5, the resin component contained in the mixed solution for forming the coating film 9 was set to be an acryl-ester copolymer (trade name: Nipol SX1706A (produced by ZEON Corporation)), the etching component was set to be sulfuric acid, the surfactant was set to be sodium alkylallylsulfosuccinate (trade name: ELEMINOL JS-2 (produced by Sanyo Chemical Industries, Ltd.)), the etching-facilitation component was set to be hydrogen peroxide and, in addition, the content of the resin component relative to the mixed solution was changed in the range of 0.5 g to 1.5 g.

In Example 6 to Example 8, the resin component contained in the mixed solution for forming the coating film 9 was set to be an acryl-ester copolymer (trade name: Nipol SX1706A (produced by ZEON Corporation)), the etching component was set to be sulfuric acid, the surfactant was set to be sodium alkylallylsulfosuccinate (trade name: ELEMINOL JS-2 (produced by Sanyo Chemical Industries, Ltd.)), the etching-facilitation component was set to be hydrogen peroxide, the additive was set to be iron(III) fluoride and, in addition, the content of the sulfuric acid serving as the etching component relative to the mixed solution was changed in the range of 0.02 g to 0.1 g. In this regard, the content of the surfactant was set to be 0.2 g in Example 6 and Example 7 and was set to be 0.1 g in Example 8.

In Example 9 to Example 11, the resin component contained in the mixed solution for forming the coating film 9 was set to be an acryl-ester copolymer (trade name: Nipol SX1706A (produced by ZEON Corporation)), the etching component was set to be sulfuric acid, the surfactant was set to be sodium alkylallylsulfosuccinate (trade name: ELEMINOL JS-2 (produced by Sanyo Chemical Industries, Ltd.)), the etching-facilitation component was set to be hydrogen peroxide, the additive was set to be iron(III) fluoride and, in addition, the content of the etching-facilitation component relative to the mixed solution was changed in the range of 0.01 g to 0.3 g. In this regard, the content of the surfactant was set to be 0.5 g in Example 9 and was set to be 0.2 g in Example 10 and Example 11.

In Example 12 to Example 14, the resin component contained in the mixed solution for forming the coating film 9 was set to be an acryl-ester copolymer (trade name: Nipol SX1706A (produced by ZEON Corporation)), the etching component was set to be sulfuric acid, the surfactant was set to be sodium alkylallylsulfosuccinate (trade name: ELEMINOL JS-2 (produced by Sanyo Chemical Industries, Ltd.)), the etching-facilitation component was set to be hydrogen peroxide, the additive was set to be iron(III) fluoride and, in addition, the content of sulfuric acid serving as the etching component relative to the mixed solution was changed in the range of 0 g (not contained) to 0.005 g.

In Example 15, the resin component contained in the mixed solution for forming the coating film 9 was set to be an acryl-ester copolymer (trade name: Nipol SX1706A (produced by ZEON Corporation)), the etching component was set to be sulfuric acid, the surfactant was set to be sodium alkylallylsulfosuccinate (trade name: ELEMINOL JS-2 (produced by Sanyo Chemical Industries, Ltd.)), the etching-facilitation component was set to be sodium peroxodisulfate, and the additive was set to be iron(III) fluoride.

In Example 16 to Example 18, the resin component contained in the mixed solution for forming the coating film 9 was set to be an acryl-ester copolymer (trade name: Nipol SX1706A (produced by ZEON Corporation)), the etching component was set to be sulfuric acid, the etching-facilitation component was set to be hydrogen peroxide, and the additive was set to be iron(III) fluoride. Then, the surfactant contained in the mixed solution for forming the coating film 9 was set to be β-naphthalenesulfonic acid formalin condensate sodium salt (trade name: DEMOL N (produced by Kao Corporation)) in Example 16, was set to be sodium dioctylsulfosuccinate (trade name: RAPISOL A-80 (produced by NOF CORPORATION)) in Example 17, and was set to be straight-chain sodium alkylbenzenesulfonate (NE-WREX R (produced by NOF CORPORATION)) in Example 18.

The resin component contained in the mixed solution for forming the coating film 9 was set to be a styrene-acryl copolymer (trade name: Neocryl A-655 (produced by Kusumoto Chemicals, Ltd.)) in Example 19 and was set to be an acryl-ester copolymer (trade name: Nipol LX814 (produced by ZEON Corporation)) in Example 20. Also, in Example 19 and Example 20, the etching component contained in the mixed solution for forming the coating film 9 was set to be sulfuric acid, the surfactant was set to be sodium alkylallylsulfosuccinate (trade name: ELEMINOL JS-2 (produced by Sanyo Chemical Industries, Ltd.)), the etching-facilitation component was set to be hydrogen peroxide, and the additive was set to be iron(III) fluoride.

In Example 21 to Example 23, the resin component contained in the mixed solution for forming the coating film 9 was set to be an acryl-ester copolymer (trade name: Nipol SX1706A (produced by ZEON Corporation)), the surfactant was set to be sodium alkylallylsulfosuccinate (trade name: ELEMINOL JS-2 (produced by Sanyo Chemical Industries, Ltd.)), the etching-facilitation component was set to be hydrogen peroxide, and the additive was set to be iron(III) fluoride. Then, the etching component contained in the mixed solution for forming the coating film 9 was set to be nitric acid in Example 21, was set to be hydrochloric acid in Example 22, and was set to be acetic acid in Example 23.

In Example 24 to Example 26, the resin component contained in the mixed solution for forming the coating film 9 was set to be an acryl-ester copolymer (trade name: Nipol SX1706A (produced by ZEON Corporation)), the etching component was set to be hydrofluoric acid, the surfactant was set to be sodium alkylallylsulfosuccinate (trade name: ELEMINOL JS-2 (produced by Sanyo Chemical Industries, Ltd.)), the etching-facilitation component was set to be hydrogen peroxide, the additive was set to be iron(III) fluoride and, in addition, the content of hydrofluoric acid serving as the etching component relative to the mixed solution was changed in the range of 0.02 g to 0.1 g.

The resin component contained in the mixed solution for forming the coating film 9 was set to be a silicone resin (trade name: POLON-MF-56 (produced by Shin-Etsu Silicone)) in Example 27, was set to be a silicone resin (trade name: X-51-1318 (produced by Shin-Etsu Silicone)) in Example 28, and was set to be an epoxy-acryl resin (trade name: MODEPICS-302 (produced by ARAKAWA CHEMICAL INDUSTRIES LTD.)) in Example 29. Also, in Example 27 to Example 29, the etching component contained in the mixed solution for forming the coating film 9 was set to be hydrofluoric acid, the surfactant was set to be sodium alkylallylsulfosuccinate (trade name: ELEMINOL JS-2 (produced by Sanyo Chemical Industries, Ltd.)), the etching-facilitation component was set to be hydrogen peroxide, and the additive was set to be iron(III) fluoride.

Next, the sample of each of Comparative example 1 and Comparative example 2 shown in Table 3 was produced. In each experiment, 100 samples of each of Comparative example 1 and Comparative example 2 were prepared.

(Comparative Examples)

In Comparative example 1, the coating film 9 of the electronic component 1B was formed by employing the phosphate chemical conversion treatment.

Meanwhile, in Comparative example 2, the resin component contained in the mixed solution for forming the coating film 9 was set to be an acryl-ester copolymer (trade name: Nipol SX1706A (produced by ZEON Corporation)), the surfactant was set to be sodium alkylallylsulfosuccinate (trade name: ELEMINOL JS-2 (produced by Sanyo Chemical Industries, Ltd.)), the additive was set to be iron(III) fluoride, and the etching component and the etching-facilitation component were not contained.

(Evaluation Method)

The experiment for evaluating the reliability of connection of the electronic component 1B was performed. The experiment for examining the reliability of connection (fixing force test) was the same as the experiments performed with respect to the electronic component 1 according to the first embodiment and the electronic component 1A according to the second embodiment. That is, as shown in FIG. 18, each sample was soldered to the circuit board B1, the circuit board B1 was stood vertically, and a force F was applied to the side surface of each sample downward in the vertical direction. Then, the force applied to the side surface of each sample was measured at the point in time when each sample came off the circuit board B1.

In addition, the experiment for evaluating the moisture resistance of the electronic component 1B was performed. The experiment for examining the moisture resistance (moisture resistance test) was the same as the experiments performed with respect to the electronic component 1 according to the first embodiment and the electronic component 1A according to the second embodiment. That is, the normality of the continuity of each sample was examined at a high temperature and a high humidity. Regarding the specific conditions of the experiment, the temperature was 85° C.±2° C. and the humidity was 85%±2%, and a current of 6 A was passed continuously. Then, 24 hours after start of the experiment, the state of continuity of the evaluation sample was examined. That is, regarding the evaluation criteria, a sample that exhibited continuity 24 hours after start of the experiment was rated as non-defective, and a component that exhibited no continuity 24 hours after start of the experiment was rated as defective. Then, regarding the samples, the case where the probability of non-defective samples being included (non-defective rate) was 70% or more was rated as non-defective.

Table 2 shows the evaluation results of Example 1 to Example 29.

In addition, Table 3 shows the evaluation results of Comparative example 1 and Comparative example 2.

TABLE 2

| | Number No. | Resin component Type (trade name) | Amount (solid content) | Etching component Type | Amount | Surfactant component Type (trade name) | Amount | Oxidizing agent Type | Amount |
|---|---|---|---|---|---|---|---|---|---|
| Example | 1 | Nipol SX1706A | 1 g | sulfuric acid | 0.05 g | ELEMINOL JS-2 | 0.2 g | — | — |
| | 2 | Nipol SX1706A | 1 g | sulfuric acid | 0.05 g | ELEMINOL JS-2 | 0.2 g | — | — |
| | 3 | Nipol SX1706A | 0.5 g | sulfuric acid | 0.05 g | ELEMINOL JS-2 | 0.2 g | hydrogen peroxide | 0.06 g |
| | 4 | Nipol SX1706A | 1 g | sulfuric acid | 0.05 g | ELEMINOL JS-2 | 0.2 g | hydrogen peroxide | 0.06 g |
| | 5 | Nipol SX1706A | 1.5 g | sulfuric acid | 0.05 g | ELEMINOL JS-2 | 0.2 g | hydrogen peroxide | 0.06 g |
| | 6 | Nipol SX1706A | 1 g | sulfuric acid | 0.02 g | ELEMINOL JS-2 | 0.2 g | hydrogen peroxide | 0.06 g |
| | 7 | Nipol SX1706A | 1 g | sulfuric acid | 0.10 g | ELEMINOL JS-2 | 0.2 g | hydrogen peroxide | 0.06 g |
| | 8 | Nipol SX1706A | 1 g | sulfuric acid | 0.05 g | ELEMINOL JS-2 | 0.1 g | hydrogen peroxide | 0.06 g |
| | 9 | Nipol SX1706A | 1 g | sulfuric acid | 0.05 g | ELEMINOL JS-2 | 0.5 g | hydrogen peroxide | 0.06 g |
| | 10 | Nipol SX1706A | 1 g | sulfuric acid | 0.05 g | ELEMINOL JS-2 | 0.2 g | hydrogen peroxide | 0.01 g |
| | 11 | Nipol SX1706A | 1 g | sulfuric acid | 0.05 g | ELEMINOL JS-2 | 0.2 g | hydrogen peroxide | 0.30 g |
| | 12 | Nipol SX1706A | 1 g | sulfuric acid | 0.05 g | ELEMINOL JS-2 | 0.2 g | hydrogen peroxide | 0.06 g |
| | 13 | Nipol SX1706A | 1 g | sulfuric acid | 0.05 g | ELEMINOL JS-2 | 0.2 g | hydrogen peroxide | 0.06 g |
| | 14 | Nipol SX1706A | 1 g | sulfuric acid | 0.05 g | ELEMINOL JS-2 | 0.2 g | hydrogen peroxide | 0.06 g |
| | 15 | Nipol SX1706A | 1 g | sulfuric acid | 0.05 g | ELEMINOL JS-2 | 0.2 g | sodium peroxodisulfate | 0.06 g |
| | 16 | Nipol SX1706A | 1 g | sulfuric acid | 0.05 g | DEMOL N | 0.2 g | hydrogen peroxide | 0.06 g |
| | 17 | Nipol SX1706A | 1 g | sulfuric acid | 0.05 g | RAPISOL A-80 | 0.2 g | hydrogen peroxide | 0.06 g |
| | 18 | Nipol SX1706A | 1 g | sulfuric acid | 0.05 g | NEWREX R | 0.2 g | hydrogen peroxide | 0.06 g |
| | 19 | Neocryl A-655 | 1 g | sulfuric acid | 0.05 g | ELEMINOL JS-2 | 0.2 g | hydrogen peroxide | 0.06 g |
| | 20 | Nipol LX814A | 1 g | sulfuric acid | 0.05 g | ELEMINOL JS-2 | 0.2 g | hydrogen peroxide | 0.06 g |
| | 21 | Nipol SX1706A | 1 g | nitric acid | 0.05 g | ELEMINOL JS-2 | 0.2 g | hydrogen peroxide | 0.06 g |
| | 22 | Nipol SX1706A | 1 g | hydrochloric acid | 0.05 g | ELEMINOL JS-2 | 0.2 g | hydrogen peroxide | 0.06 g |
| | 23 | Nipol SX1706A | 1 g | acetic acid | 0.05 g | ELEMINOL JS-2 | 0.2 g | hydrogen peroxide | 0.06 g |

TABLE 2-continued

| | | | | | | | |
|---|---|---|---|---|---|---|---|
| 24 | Nipol SX1706A | 1 g | hydrofluoric acid | 0.02 g | ELEMINOL JS-2 | 0.2 g | hydrogen peroxide | 0.06 g |
| 25 | Nipol SX1706A | 1 g | hydrofluoric acid | 0.05 g | ELEMINOL JS-2 | 0.2 g | hydrogen peroxide | 0.06 g |
| 26 | Nipol SX1706A | 1 g | hydrofluoric acid | 0.10 g | ELEMINOL JS-2 | 0.2 g | hydrogen peroxide | 0.06 g |
| 27 | POLON-MF-56 | 1 g | hydrofluoric acid | 0.05 g | ELEMINOL JS-2 | 0.2 g | hydrogen peroxide | 0.06 g |
| 28 | X-51-1318 | 1 g | hydrofluoric acid | 0.05 g | ELEMINOL JS-2 | 0.2 g | hydrogen peroxide | 0.06 g |
| 29 | MODEPICS-302 | 1 g | hydrofluoric acid | 0.05 g | ELEMINOL JS-2 | 0.2 g | hydrogen peroxide | 0.06 g |

| | Number No. | Additive Type | Additive Amount | Solvent Type | Solvent Amount | Fixing force test Minimum value [N] | Fixing force test Average value [N] | Moisture resistance test Non-defective rate [%] |
|---|---|---|---|---|---|---|---|---|
| Example | 1 | — | — | pure water | 15.7 g | 23 | 24 | 70 |
| | 2 | iron(III) fluoride | 0.002 g | pure water | 15.7 g | 25 | 26 | 70 |
| | 3 | iron(III) fluoride | 0.002 g | pure water | 15.7 g | 32 | 33 | 92 |
| | 4 | iron(III) fluoride | 0.002 g | pure water | 15.7 g | 32 | 34 | 95 |
| | 5 | iron(III) fluoride | 0.002 g | pure water | 15.7 g | 29 | 30 | 95 |
| | 6 | iron(III) fluoride | 0.002 g | pure water | 15.7 g | 32 | 34 | 91 |
| | 7 | iron(III) fluoride | 0.002 g | pure water | 15.7 g | 32 | 34 | 95 |
| | 8 | iron(III) fluoride | 0.002 g | pure water | 15.7 g | 30 | 33 | 94 |
| | 9 | iron(III) fluoride | 0.002 g | pure water | 15.7 g | 30 | 32 | 92 |
| | 10 | iron(III) fluoride | 0.002 g | pure water | 15.7 g | 31 | 32 | 91 |
| | 11 | iron(III) fluoride | 0.002 g | pure water | 15.7 g | 31 | 34 | 93 |
| | 12 | iron(III) fluoride | 0.0005 g | pure water | 15.7 g | 32 | 34 | 90 |
| | 13 | iron(III) fluoride | 0.005 g | pure water | 15.7 g | 32 | 33 | 94 |
| | 14 | — | — | pure water | 15.7 g | 31 | 31 | 84 |
| | 15 | iron(III) fluoride | 0.002 g | pure water | 15.7 g | 32 | 33 | 94 |
| | 16 | iron(III) fluoride | 0.002 g | pure water | 15.7 g | 29 | 30 | 81 |
| | 17 | iron(III) fluoride | 0.002 g | pure water | 15.7 g | 31 | 32 | 91 |
| | 18 | iron(III) fluoride | 0.002 g | pure water | 15.7 g | 30 | 32 | 90 |
| | 19 | iron(III) fluoride | 0.002 g | pure water | 15.7 g | 30 | 30 | 85 |
| | 20 | iron(III) fluoride | 0.002 g | pure water | 15.7 g | 30 | 33 | 90 |
| | 21 | iron(III) fluoride | 0.002 g | pure water | 15.7 g | 32 | 33 | 87 |
| | 22 | iron(III) fluoride | 0.002 g | pure water | 15.7 g | 30 | 31 | 92 |
| | 23 | iron(III) fluoride | 0.002 g | pure water | 15.7 g | 30 | 30 | 86 |
| | 24 | iron(III) fluoride | 0.002 g | pure water | 15.7 g | 31 | 34 | 94 |
| | 25 | iron(III) fluoride | 0.002 g | pure water | 15.7 g | 34 | 37 | 99 |
| | 26 | iron(III) fluoride | 0.002 g | pure water | 15.7 g | 32 | 34 | 95 |
| | 27 | iron(III) fluoride | 0.002 g | pure water | 15.7 g | 28 | 29 | 98 |

TABLE 2-continued

| | | | | | | | |
|---|---|---|---|---|---|---|---|
| 28 | iron(III) fluoride | 0.002 g | pure water | 15.7 g | 27 | 29 | 99 |
| 29 | iron(III) fluoride | 0.002 g | pure water | 15.7 g | 30 | 32 | 94 |

TABLE 3

| | | Resin component | | | | Surfactant component | | Oxidizing agent | |
|---|---|---|---|---|---|---|---|---|---|
| | Number No. | Type (trade name) | Amount (solid content) | Etching component Type | Amount | Type (trade name) | Amount | Type | Amount |
| Comparative example | 1 | phosphate chemical conversion treatment | — | — | — | — | — | — | — |
| | 2 | Nipol SX1706A | — | — | — | ELEMINOL JS-2 | — | — | — |

| | Number No. | Additive Type | Amount | Solvent Type | Amount | Fixing force test Minimum value [N] | Fixing force test Average value [N] | Moisture resistance test Non-defective rate [%] |
|---|---|---|---|---|---|---|---|---|
| Comparative example | 1 | — | — | — | — | 25 | 26 | 67 |
| | 2 | iron(III) fluoride | 0.002 g | pure water | — | — | — | — |

As shown in Table 2, in the case of Example 1 to Example 29, the coating film 9 is formed by using the mixed solution (resin emulsion) containing the etching component for ionizing the metal constituting the metal magnetic powder, the anionic surfactant, and the resin component and, thereby, the minimum force of the force F applied to the side surface of each sample was 23 N in the fixing force test, and all non-defective rates were 70% or more in the moisture resistance test. Therefore, good results were obtained in all Examples.

On the other hand, as shown in Table 3, in the case of Comparative example 1, the coating film was formed by employing the phosphate chemical conversion treatment and, thereby, the minimum force of the force F applied to the side surface of the sample was 25 N, whereas the non-defective rate was 67% in the moisture resistance test. Therefore, the sample was rated as defective. Also, in the case of Comparative example 2, the coating film was not formed because the etching component was not contained in the mixed solution (resin emulsion) for forming the coating film. Therefore, the fixing force test and the moisture resistance test were not able to be performed.

In this regard, in the case where the coating film 9 is formed on the main body 10, the film formation property of the coating film 9 is important. The film formation property is evaluated on the basis of the close contact of the coating film 9 with the main body 10, the uniformity of the coating film 9, and the deposition property, which indicates that a neutralization reaction is not excessively slow and the resin component constituting the coating film 9 deposits on the main body 10 in a shorter time. Among them, the deposition property is particularly important from the viewpoint of production efficiency.

According to the results of the present experiments, when attention is given to the resin component, all resin components in the examples exhibited good film formation property. In particular, the film formation property (deposition property) was good in the order of the acryl-ester copolymer (trade name: Nipol SX1706A (produced by ZEON Corporation)), the acryl-ester copolymer (trade name: Nipol LX814 (produced by ZEON Corporation)), and the styrene-acryl copolymer (trade name: Neocryl A-655 (produced by Kusumoto Chemicals, Ltd.)).

Also, when attention is given to the etching component, all etching components in the examples exhibited good film formation property. In particular, the film formation property (deposition property) was good in the order of hydrofluoric acid, sulfuric acid, acetic acid, nitric acid, and hydrochloric acid.

Also, when attention is given to the surfactant, all surfactants in the examples exhibited good film formation property. In particular, the film formation property (deposition property) was good in the order of sodium alkylallylsulfosuccinate (trade name: ELEMINOL JS-2 (produced by Sanyo Chemical Industries, Ltd.)), straight-chain sodium alkylbenzenesulfonate (NEWREX R (produced by NOF CORPORATION)), sodium dioctylsulfosuccinate (trade name: RAPISOL A-80 (produced by NOF CORPORATION)), and β-naphthalenesulfonic acid formalin condensate sodium salt (trade name: DEMOL N (produced by Kao Corporation)).

Further, when Example 1 and other Examples are compared, the result of the fixing force test of the electronic component 1B, in which iron(III) fluoride was contained in the mixed solution, was better than the result of the fixing force test of the electronic component 1B, in which iron(III) fluoride was not contained.

In this regard, the electronic component and the method for manufacturing the same according to the present disclosure are not limited to the above-described embodiments and can be variously modified within the scope of the gist thereof.

Regarding the mixed solution for forming the coating film 9, tannin for improving the corrosion resistance, plasticizers, e.g., dibutylphthalate, for imparting the flexibility to the coating film 9, metal ions, e.g., silver fluoride, for improving the film formation property of the coating film 9, and lubricants, e.g., fluororesin lubricants, polyolefin wax, melamine cyanurate, and molybdenum disulfide, for preventing scratching of the surface and improving the water resistance of the coating film 9 may be added to the mixed solution.

Further, for the purpose of improving the corrosion resistance of the coating film 9 and coloring the electronic component, pigments, e.g., carbon black and phthalocyanine blue, may be added to the mixed solution for forming the coating film 9.

In addition, the corrosion resistance and the chemical resistance can be improved by adding a high-molecular-weight polymer having an acid group containing phosphorus, for example, an organic high-molecular-weight compound having a phosphoric acid group, a phosphorous acid group, a phosphonic acid group, a phosphinic acid group, or the like in a main chain or side chain, to the mixed solution for forming the coating film 9.

Also, from the viewpoint of improving the strength, the thermal conductivity, the electrical conductivity, and the like of the coating film 9, fillers and the like, for example, glass fibers, calcium carbonate, aramid fibers, graphite, alumina, aluminum nitride, and boron nitride may be added to the mixed solution. Further, the circuit element that is an inner conductor located inside the element assembly is not limited to the inductor. In addition, the configurations of some examples may be combined.

INDUSTRIAL APPLICABILITY

As described above, the present disclosure is useful for the electronic component and the method for manufacturing the same. In particular, in the electronic component including an insulator containing a metal magnetic powder, a resin coating film can be obtained on the insulator and, thereby, an electronic component exhibiting excellent moisture resistance and chemical resistance can be obtained.

The invention claimed is:
1. An electronic component comprising:
a main body including an element assembly composed of a metal magnetic powder and an insulating resin and an inner conductor located inside the element assembly;
a coating film covering the main body;
outer electrodes connected to the inner conductor,
wherein the coating film contains a reaction product of a resin and a cation of an element constituting the metal magnetic powder; and
a magnetic path is disposed on an inner circumference of the inner conductor.
2. The electronic component according to claim 1,
wherein the metal magnetic powder is a powder of Fe or an Fe alloy, and
the inner conductor is Cu or Ag.

* * * * *